US012608467B2

(12) United States Patent
Tahara

(10) Patent No.: US 12,608,467 B2
(45) Date of Patent: Apr. 21, 2026

(54) CONTROLLER SYSTEM, CONTROL APPARATUS, AND NON-TRANSITORY COMPUTER READABLE MEDIUM

(71) Applicant: OMRON Corporation, Kyoto (JP)

(72) Inventor: Yutaka Tahara, Ritto (JP)

(73) Assignee: OMRON Corporation, Kyoto (JP)

( * ) Notice: Subject to any disclaimer, the term of this patent is extended or adjusted under 35 U.S.C. 154(b) by 459 days.

(21) Appl. No.: 17/294,691

(22) PCT Filed: Nov. 28, 2019

(86) PCT No.: PCT/JP2019/046606
§ 371 (c)(1),
(2) Date: May 18, 2021

(87) PCT Pub. No.: WO2020/137345
PCT Pub. Date: Jul. 2, 2020

(65) Prior Publication Data
US 2022/0012333 A1 Jan. 13, 2022

(30) Foreign Application Priority Data

Dec. 28, 2018 (JP) ................................. 2018-246642

(51) Int. Cl.
*G06F 21/55* (2013.01)
*H04L 67/12* (2022.01)
(52) U.S. Cl.
CPC ...... *G06F 21/554* (2013.01); *G06F 2221/034* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 7,050,860 B2 | 5/2006 | Muneta et al. | |
| 10,241,696 B1 * | 3/2019 | Kowalyshyn | ........... G06F 21/62 |
| 2015/0081736 A1 | 3/2015 | Weik, III et al. | |

(Continued)

FOREIGN PATENT DOCUMENTS

| | | |
|---|---|---|
| CN | 103995500 | 8/2014 |
| CN | 108693822 | 10/2018 |

(Continued)

OTHER PUBLICATIONS

Hertogh, et al., 2023, October. Quarantine: Mitigating transient execution attacks with physical domain isolation. In Proceedings of the 26th International Symposium on Research in Attacks, Intrusions and Defenses (pp. 207-221). (Year: 2023).*

(Continued)

*Primary Examiner* — Luu T Pham
*Assistant Examiner* — Edward X Long
(74) *Attorney, Agent, or Firm* — JCIPRNET

(57) ABSTRACT

The purpose of the present invention is to solve the new problem of appropriately protecting a control apparatus and a controller system including the control apparatus against a security event. The execution content of a security protection process performed by a security-monitoring device is determined in accordance with the action state of this control apparatus and/or a notification issued through a control arithmetic operation by the control apparatus.

15 Claims, 18 Drawing Sheets

(56) References Cited

U.S. PATENT DOCUMENTS

| | | | | |
|---|---|---|---|---|
| 2015/0121538 A1* | 4/2015 | Hsu | .......................... | G06F 21/53 |
| | | | | 726/26 |
| 2015/0295944 A1 | 10/2015 | Yunoki et al. | | |
| 2016/0180087 A1* | 6/2016 | Edwards | ............... | H04L 63/145 |
| | | | | 726/24 |
| 2017/0279685 A1* | 9/2017 | Mota | ....................... | H04L 41/12 |

FOREIGN PATENT DOCUMENTS

| | | |
|---|---|---|
| JP | 2005115426 | 4/2005 |
| JP | 2010066840 | 3/2010 |
| JP | 2014119909 | 6/2014 |
| JP | 2015187860 | 10/2015 |
| JP | 6407494 | 10/2018 |
| JP | 2018173883 | 11/2018 |
| WO | 2013145105 | 10/2013 |
| WO | 2015001594 | 1/2015 |
| WO | 2016157477 | 10/2016 |

OTHER PUBLICATIONS

Aydemir, F. and Cilkaya, E., 2021. A system design for monitoring the violation of home quarantine. IEEE Consumer Electronics Magazine, 11(3), pp. 25-29. (Year: 2021).*

"International Search Report (Form PCT/ISA/210) of PCT/JP2019/046606," mailed on Mar. 3, 2020, with English translation thereof, pp. 1-4.

"Written Opinion of the International Searching Authority (Form PCT/ISA/237) of PCT/JP2019/046606," mailed on Mar. 3, 2020, with English translation thereof, pp. 1-10.

"Search Report of Europe Counterpart Application", issued on Aug. 3, 2022, pp. 1-7.

"Office Action of China Counterpart Application", issued on Jan. 11, 2024, with English translation thereof, p. 1-p. 29.

* cited by examiner

| Action state, Notified results | Security level |
|---|---|
| Program mode | 3 |
| Operation mode | 2 |
| On-line editing mode | 1 |
| Maintenance mode | 0 |
| Abnormal | 4 |

FIG.10

| Security level | Contents of security protection process | | | |
| --- | --- | --- | --- | --- |
| | Packet filter | Communication with superordinate apparatus | Communication with external NW | VPN setting |
| 0 | Enabled | Disabled | External NW ⇔ Control apparatus | Enabled |
| 1 | Enabled | Superordinate apparatus ⇔ control apparatus | External NW ⇔ Control apparatus | Enabled |
| 2 | Enabled | Superordinate apparatus ⇔ control apparatus | Disabled | Disabled |
| 3 | Disabled | Disabled | Disabled | Disabled |
| 4 | Enabled | Superordinate apparatus ⇔ control apparatus | External NW ⇔ Control apparatus | Enabled |

FIG.11

VPN Setting

○ Do not Use    ● Use } 810
  812            814

| User | PreShared Key | Authen. Algorithm | Encrypt. Algorithm | VPN Client Address | Destination Address | VPN Group |
|------|---------------|-------------------|--------------------|--------------------|---------------------|-----------|
| User_AAA | Pass_1234 | MD5 ▶ | AES ▶ | 20.0.0.1 | 192.168.1.0/24 | Administrator |
| User_BBB | Pass_5678 | MD5 ▶ | AES ▶ | 20.0.0.1 | 192.168.1.0/24 | Maintainer |
| User_CCC | Pass_9012 | MD5 ▶ | AES ▶ | 20.0.10.1 | 192.168.2.0/24 | Engineer |
| User_DDD | Pass_3456 | MD5 ▶ | AES ▶ | 20.0.20.1 | 192.168.3.0/24 | Engineer |
| User_EEE | Pass_7890 | MD5 ▶ | AES ▶ | 20.0.30.1 | 192.168.4.0/24 | Engineer |

CONTROLLER SYSTEM, CONTROL APPARATUS, AND NON-TRANSITORY COMPUTER READABLE MEDIUM

CROSS-REFERENCE TO RELATED APPLICATION

This application is a 371 application of the International PCT application serial no. PCT/JP2019/046606, filed on Nov. 28, 2019, which claims the priority benefits of Japan Patent Application No. 2018-246642, filed on Dec. 28, 2018. The entirety of each of the above-mentioned patent applications is hereby incorporated by reference herein and made a part of this specification.

BACKGROUND OF THE INVENTION

1. Field of the Invention

The invention relates to a security function with respect to a controller system controlling a control target.

2. Description of Related Art

In various manufacturing sites, control apparatuses such as programmable logic controllers (PLCs), etc., have been introduced. Such control apparatus is a computer and executes a control program designed in correspondence with a manufacturing apparatus or manufacturing equipment. The control apparatus is connected with various apparatuses in or outside a factory via a relay.

For example, Japanese Patent No. 6407494 (Patent Document 1) discloses a control apparatus communicably connected with a cloud system outside a factory via a router as an example of the relay.

In addition, PCT Publication No. 2016/157477 (Patent Document 2) discloses a control apparatus communicably connected with another control apparatus via a router as an example of the relay.

PRIOR ART LITERATURE

Patent Document(s)

[Patent Document 1] Japanese Patent No. 6407494
[Patent Document 2] PCT Publication No. 2016/157477

SUMMARY OF THE INVENTION

Problems to be Solved by the Invention

Like the control apparatus disclosed in Patent Document 1, with the progress in information and communication technology (ICT) in recent years, control apparatuses are connected with various external apparatuses via a network. In addition, the processing executed in the control apparatus has become more sophisticated. With such networking or intelligentization, various security threats may occur to the control apparatus.

In the conventional control apparatus, no security events, including security threats that may occur through networking or intelligentization, is anticipated.

An objective of the invention is to solve the new issue of appropriately protecting a control apparatus and a controller system including the control apparatus against security events which may occur through the networking or the intelligentization of the control apparatus and the control system.

Means to Solve Problems

According to an example of the disclosure, a controller system is provided. The controller system includes: a control apparatus, executing a control program for realizing a control arithmetic operation for controlling a control target; and a security monitoring device, executing a security protection process including detection of a security event possible to occur in the controller system and execution of a process in correspondence with the security event. Execution contents of the security protection process performed by the security monitoring device are determined in accordance with at least one of an action state of the control apparatus and a notification issued by the control arithmetic operation by the control apparatus.

According to the disclosure, security countermeasures can be appropriately taken in correspondence with the state of the control target specified from the action state of the control apparatus or the results of the control arithmetic operation. As a result, the controller system can be appropriately protected against a security event that may occur.

According to the disclosure, the control program includes a user program arbitrarily formed by a user and a system program for providing a function as the control apparatus. The action state is controlled through execution of the system program. The notification issued by the control arithmetic operation by the control apparatus is a notification issued through execution of the user program.

According to the disclosure, if the execution contents of the security protection process can be determined according to an arbitrary condition set by the user, the execution contents of the security protection process can also be determined in correspondence with the action state provided in advance in the control apparatus.

In the disclosure, the action state includes an execution state in which the control program is executed. In a case in which the control apparatus is in the execution state, the security monitoring device executes the security protection process to enable communication between the control apparatus and a superordinate apparatus of the control apparatus.

According to the disclosure, for example, the control apparatus can upload logs during the execution of the control program to the superordinate apparatus.

In the disclosure, the action state includes a permitted state in which a change of the control program is permitted. In a case in which the control apparatus is in the permitted state, the security monitoring device executes the security protection process to disable communication between the control apparatus and a superordinate apparatus of the control apparatus.

According to the disclosure, the control program can be prevented from being changed unintentionally by the superordinate apparatus.

In the disclosure, the notification issued by the control arithmetic operation includes a notification of an abnormality generated in the control target. In a case with the notification of the abnormality, the security monitoring device enables communication between the control apparatus and a superordinate apparatus of the control apparatus.

According to the disclosure, in the case where an abnormality occurs in the control target and maintenance is required, by enabling the communication with the superordinate apparatus, the access to the control apparatus becomes flexible, and an environment where actions can be taken flexibly is provided.

According to another example of the disclosure, a control apparatus executing a control program for realizing a control arithmetic operation for controlling a control target is provided. The control apparatus includes: a communication interface for connecting with a security monitoring device executing a security protection process including detection of a security event possible to occur in the control apparatus and execution of a process in correspondence with the detected security event; and a program execution part executing the control program. The program execution part notifies the security monitoring device with an instruction for executing the security protection process determined in accordance with at least one of an action state of the control apparatus and a notification issued by the control arithmetic operation by the control apparatus.

According to the disclosure, security countermeasures can be appropriately taken in correspondence with the state of the control target specified from the action state of the control apparatus or the results of the control arithmetic operation. As a result, the control apparatus can be protected appropriately against a security event that may occur.

According to yet another example of the disclosure, a control program executed by a control apparatus for executing a control arithmetic operation for controlling a control target is provided. The control apparatus is connected with a security monitoring device executing a security protection process including detection of a security event possible to occur in the control apparatus and execution of a process in correspondence with the detected security event. The control program cause a computer to execute: a step of generating an instruction for executing the security protection process determined in accordance with at least one of an action state of the control apparatus and a notification issued by the control arithmetic operation by the control apparatus; and a step of notifying the security monitoring device with the instruction generated in the generation step.

According to the disclosure, security countermeasures can be appropriately taken in correspondence with the state of the control target specified from the action state of the control apparatus or the results of the control arithmetic operation. As a result, the control apparatus can be protected appropriately against a security event that may occur.

Inventive Effects

The control apparatus and the controller system including the control apparatus can be appropriately protected against a security event that may occur.

BRIEF DESCRIPTION OF THE DRAWINGS

FIG. 10 is a diagram illustrating a data configuration of level corresponding data 864.

FIG. 11 is a diagram illustrating a data configuration of process content corresponding data 866.

FIG. 15 is a diagram illustrating an example of a user interface for setting contents of a connection condition for connection with an outside network.

DESCRIPTION OF THE EMBODIMENTS

Figure 1:
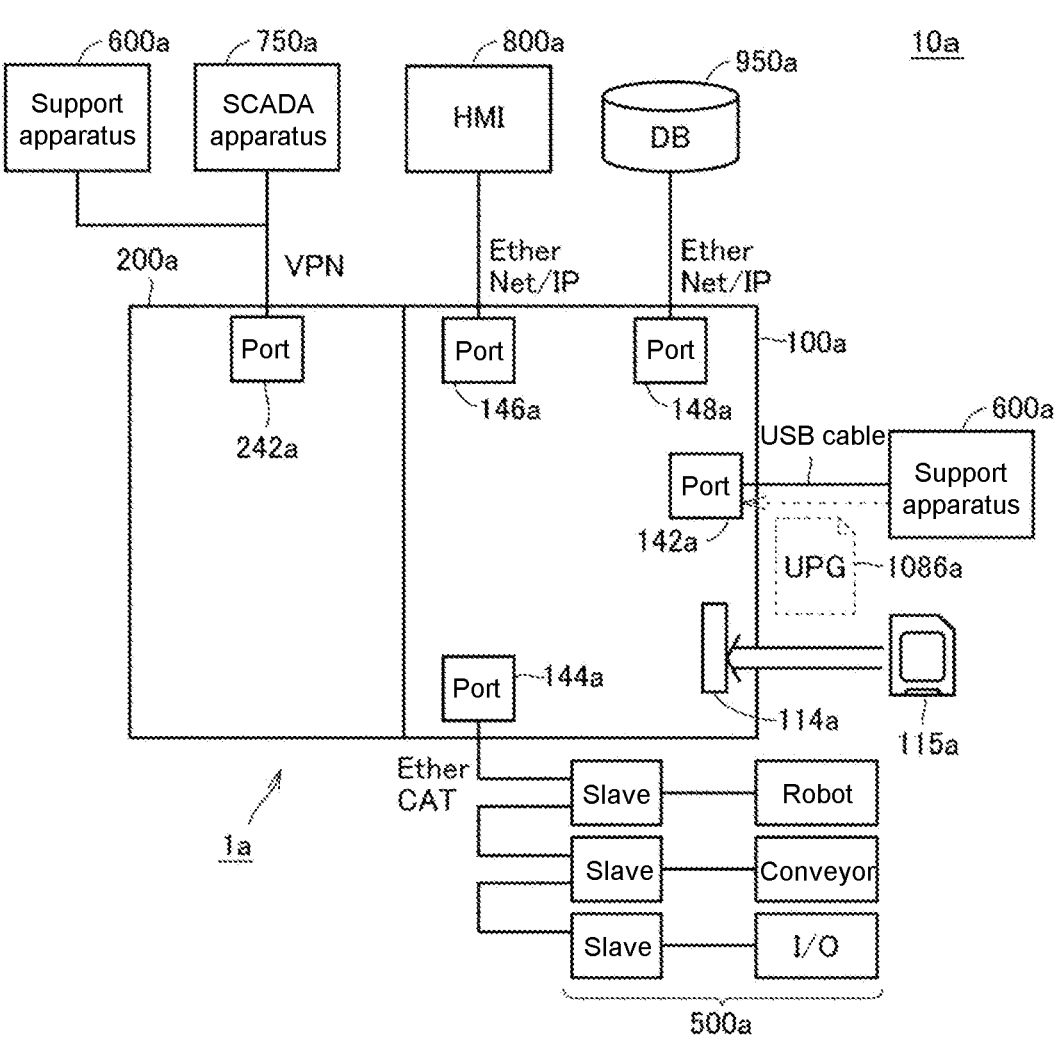
FIG. 1 is a diagram illustrating an example of a control system centering on a controller system.

Hereinafter, embodiments according to the invention will be described with reference to the drawings. In the following description, the same parts and components are designated by the same reference numerals. The names and functions thereof are also the same. Therefore, detailed descriptions thereof will not be repeated. In addition, each embodiment and each modification described below may be selectively combined as appropriate.

1. Application Example

Figure 2:
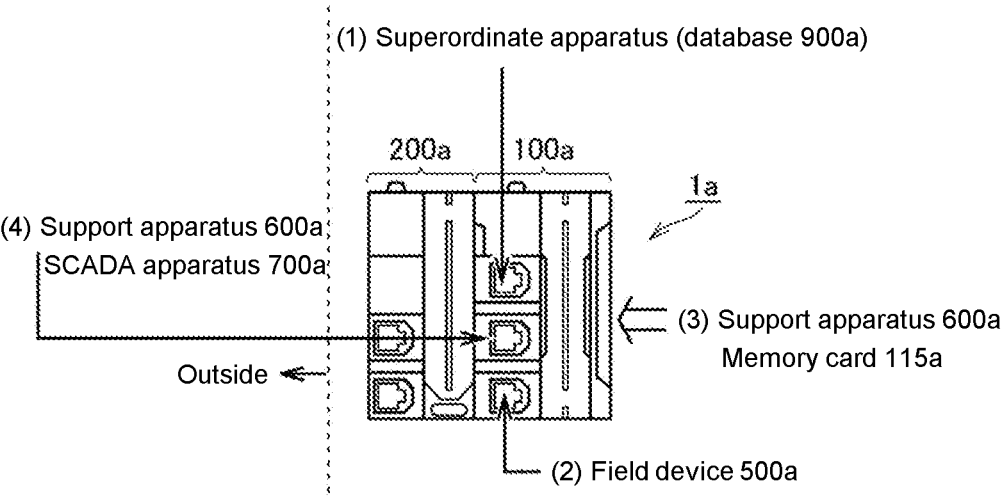
FIG. 2 is a diagram illustrating a situation in which a security event with respect to a control apparatus may occur.
Figure 3:
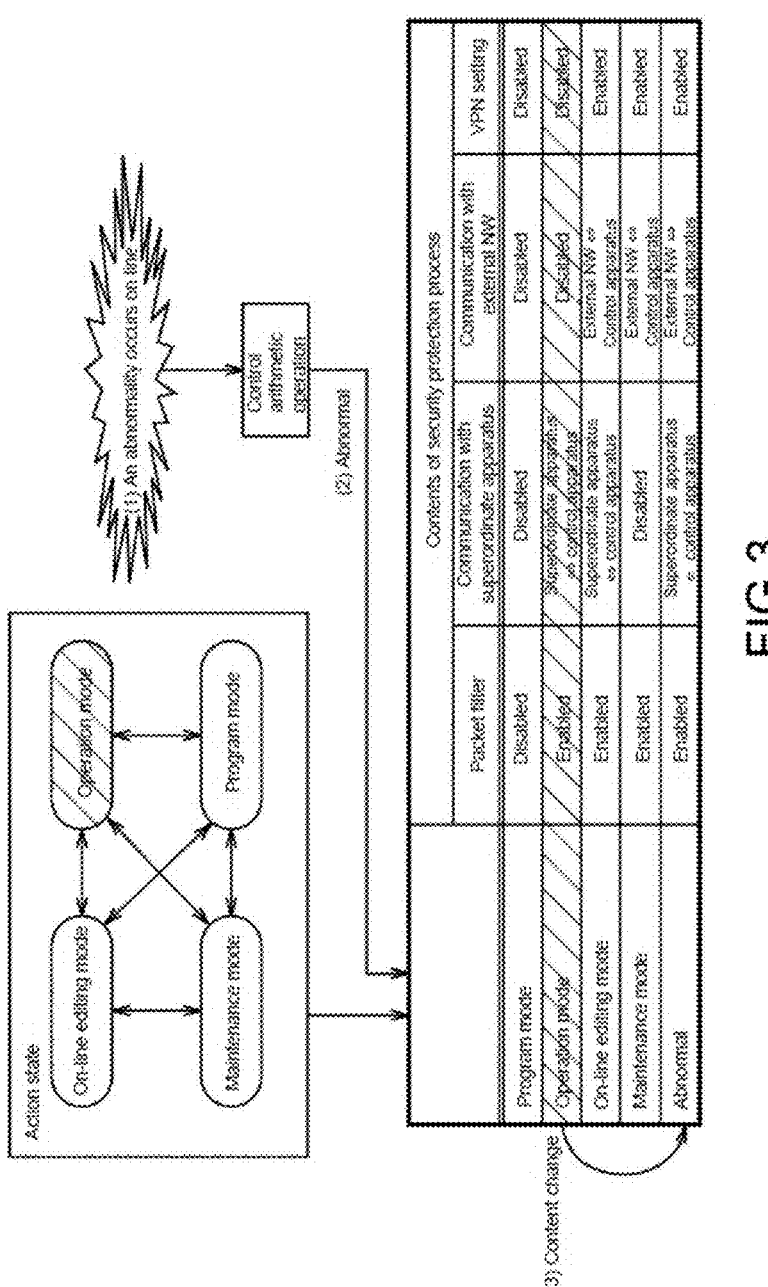
FIG. 3 is a diagram illustrating a security protection process which a security monitoring device 200a executes.

With reference to FIGS. 1 to 3, an example of the situation to which the invention is applied is described. FIG. 1 is a diagram illustrating an example of a control system 10a centering on a controller system 1a. FIG. 2 is a diagram illustrating a situation in which a security event with respect to a control apparatus 100a may occur. FIG. 3 is a diagram illustrating a security protection process which a security monitoring device 200a executes.

The controller system 1a includes the control apparatus 100a and the security monitoring device 200a. The control apparatus 100a and the security monitoring device 200a are communicably connected via any data transmission path, such as PCI Express or Ethernet (registered trademark).

The control apparatus 100a executes a control arithmetic operation for controlling a control target, and executes a core process in the controller system 1a. The control apparatus 100a has one or more communication ports. In the example shown in FIG. 1, the control apparatus 100a has communication ports 142a, 144a, 146a, and 148a.

The control apparatus 100a is communicably connected with a support apparatus 600a via the communication port 142a. The support apparatus 600a provides the user with functions, such as creating, debugging, and setting various parameters of programs executed by respective apparatuses included in the controller system 1a. A program created by the user by using the support apparatus 600a is referred to as a user program 1086a. The user program 1086a is transmitted from the support apparatus 600a to the control apparatus 100a, and is executed by the control apparatus 100a. The support apparatus 600a and the control apparatus 100a are typically connected by using a universal serial bus (USB) cable.

The user program 1086a may also be stored in a storage medium such as a memory card 115a. In the example shown in FIG. 1, the control apparatus 100a is provided with a memory card interface 114a and configured so that the memory card 115a is removable, and can read the user program 1086a stored in the memory card 115a.

The control apparatus 100a is communicably connected with a field device 500a via the communication port 144a. The field device 500a includes a sensor or a detector which collects various information required for the control arithmetic operation from the control target and an actuator which exerts a function with respect to the control target. Typically, EtherCAT (registered trademark) is used as the communication protocol between the field device 500a and the control apparatus 100a.

The control apparatus 100a is communicably connected with one or more human machine interfaces (HMIs) 800a via the communication port 146a. The HMI 800a notifies the operator with various information obtained from the control arithmetic operation in the controller system 1a and generates an internal command with respect to the controller system 1a in accordance with the operation from the operator. Typically, EtherNET/IP (registered trademark) is used as the communication protocol between the HMI 800a and the control apparatus 100a.

The control apparatus 100a is communicably connected with a database 950a via the communication port 148a. The database 950a collects various data (e.g., information relating to the traceability and measured from the work as the control target) transmitted from the controller system 1a. The database 950a may be communicably connected with the control apparatus 100a via an internal network, and may also be connected with the control apparatus 100a via a virtual private network (VPN). In the example shown in FIG. 1, EtherNet/IP (registered trademark) is used as the communication protocol between the database 950a and the control apparatus 100a.

The security monitoring device 200a is responsible for the security function with respect to the controller system 1a and executes a security protection process with respect to the controller system 1a. The security protection process will be described in greater detail in the following. The security monitoring device 200a has one or more communication ports. In the example shown in FIG. 1, the security monitoring device 200a has a communication port 242a.

The security monitoring device 200a is communicably connected with the support apparatus 600a or a supervisory control and data acquisition (SCADA) apparatus 750a. The communication between the security monitoring device 200a and the support apparatus 600a and the communication between the security monitoring device 200a and the SCAD apparatus 750a are typically performed by using a VPN.

The support apparatus 600a, for example, realizes remote maintenance of the controller system 1a through communicable connection with the security monitoring device 200a via the VPN.

The SCADA apparatus 750a notifies the operator with various information obtained from the control arithmetic operation in the controller system 1a and generates an internal command with respect to the controller system 1a in accordance with the operation from the operator. The SCADA apparatus 750 also has a function of collecting data handled by the controller system 1a.

Referring to FIG. 2, the situation in which a security event with respect to the control apparatus 100a may occur is described. Here, a "security event" covers any event which obstructs the normal operation of the equipment or machine included in the control system 10a as well as an event which may be related to such event.

In addition, "normal operation" also covers an ancillary process, such as the start-up, maintenance, and setup changes of the equipment or machine in order for the equipment or machine to continue operating according to the system design and the production plan.

In the control apparatus 100a, typically, there is a risk that a security event may occur in: (1) the communication with a superordinate apparatus such as the database 950a, (2) the communication with the control target, such as the field device 500a, (3) the communication with an apparatus which exerts a change to the control program executed by the control apparatus 100a, or (4) the communication with an external apparatus. In addition, all the physical ports provided in the control apparatus 100a bear a risk that a security event may occur. Here, the concept of the control program includes, in addition to the user program 1086a, a system program providing basic functions as the control apparatus 100a.

The security monitoring device 200a executes the security protection process, including processes of detecting a security event which may occur in the controller system 1a and responding to a security event, in various situations. The process for responding to a security event includes a process related to at least one of preventing a security event which may occur in the controller system 1a and coping with a detected security event.

Referring to FIG. 3, a security protection process which the security monitoring device 200a executes in the embodiment is described.

The security monitoring device 200a is communicably connected with the control apparatus 100a. The control apparatus 100a exerts control in at least one action state of multiple action states. The action states are states controlled through execution of the system program installed in advance in the control apparatus 100a and providing functions as the control apparatus 100a. That is, the action states of the control apparatus 100a are states defined according to the manufacturer of the control apparatus 100a.

In the example shown in FIG. 3, the control apparatus 100a is controlled in one of a "program mode", an "operation mode", an "on-line editing mode", and a "maintenance mode".

The "program mode" is an action state controlled during a period before the user program 1086a is installed to the control apparatus 100a until the installation is completed and the control apparatus 100a does not execute a program, such as an action state when the control apparatus 100a is shipped.

The "operation mode" is an action state controlled when the control apparatus 100a is executing a program, and is a mode controlled when equipment or a machine is in operation.

The "on-line edit mode" is an action state in which the control program can be rewritten during execution of the control program.

The "maintenance mode" is an action state in which the control apparatus 100a does not execute a program, and the program of the control apparatus 100a is able to be rewritten.

It is noted that these action states merely serve as an example. The types of the action states which the control apparatus 100a controls may include fewer than four types, one type, and five or more types. In addition, it is not required that the control apparatus 100a necessarily includes the action states shown in FIG. 3.

The action state is typically switched through an operation with respect to a state switching instruction from the support apparatus 100a, an internal command generated in the HMI 800a, or a key switch provided in the control apparatus 100a.

A notification issued by the control arithmetic operation executed by the control apparatus 100a, for example, is output through execution of the user program 1086a. Examples of the notification issued through the control arithmetic operation executed by the control apparatus 100a, for example, include an error (abnormality), etc., output when an abnormality occurs in a production line.

In the embodiment, the execution content of the security protection process executed by the security monitoring device 200a is determined by at least one of the action state of the control apparatus 100a and the notification issued through the control arithmetic operation by the control apparatus 100a.

More specifically, the security monitoring apparatus 200a executes security protection processes of different contents in response to the action state of the control apparatus 100a. In addition, the execution contents of the security protection process change with the notification issued through the control arithmetic operation by the control apparatus 100a.

In the example shown in FIG. 3, as an example of the security protection process, the security monitoring device 200a performs setting of the packet filtering, setting of the communication with the superordinate apparatus such as the database 950a, setting of the communication with an outside network, and setting (VPN setting) related to enabling of the access authority when the communication with the outside network is enabled. Here, the superordinate apparatus refers to an apparatus which instructs the control contents of the control apparatus 100a or an apparatus which indicates the database 950a, which is the output destination of logs indicating the program execution results of the control apparatus 100a, and is typically connected via an internal network. In addition, the outside network is different from the internal network, and is a communication path from an external network using VPN.

These setting contents are defined in accordance with the information of at least one of the action state of the control apparatus 100a and the notification issued through the control arithmetic operation by the control apparatus 100a.

For example, in the case shown in FIG. 3, the action state of the control apparatus 100a is the operation mode, and no notification is issued as the result of the control arithmetic operation. In such case, the security monitoring apparatus 200a, as the security protection process, executes a process for enabling the packet filter, enabling the communication with the superordinate apparatus (the database 950a, etc.) in both directions, and disabling the communication with the outside network.

In addition, in the example shown in FIG. 3, in the case where (1) an abnormality occurs on line and (2) the results of the control arithmetic operation become abnormal, as the security protection process, the security monitoring device 200a (3) does not change the setting of the filter packet, but disables the communication from the superordinate apparatus toward the control apparatus 100a, and permits the communication between the control apparatus 100a and the outside network in both directions.

During normal operation, the communication between the external support apparatus 600a and the control apparatus 100a is not required, but the output of the information toward the database 950a and the input of the instruction information related to the control contents are required.

Meanwhile, in the case where an abnormality occurs during operation, since remote maintenance may be required, the setting is changed to permit the communication from the outside toward the control apparatus 100a. In addition, even in the case where an abnormality occurs during operation, since it is required to be able to trace products during the period in which the abnormality occurs, the output of the information toward the database 950a continues.

Accordingly, the execution content of the security protection process executed by the security monitoring device 200a of the controller system 1a of the embodiment is determined by at least one of the action state of the control apparatus and the notification issued through the control arithmetic operation by the control apparatus.

Therefore, the controller system 1a according to the embodiment can take countermeasures against the security event which may occur in the control apparatus 100a in response to the action state of the control apparatus 100a or the results of the control arithmetic operation by the control apparatus 100a. Since the countermeasures against security events are automatically set, a user-friendly security countermeasure environment is provided. In addition, since the communication setting does not go through the user, the occurrence of a security event due to a user error can be suppressed. In particular, there are many people working in the manufacturing site in which the control system 10a is introduced, and these people may have different degrees of awareness and possess different knowledge with respect to security. In such a manufacturing site, by automatically setting the security countermeasures according to the situation, an appropriate security countermeasure environment can be provided without the cost for educating people in the site in which the control system 10a is introduced.

2. Configuration Example

<A. System Configuration of Controller System 1>

Figure 4:
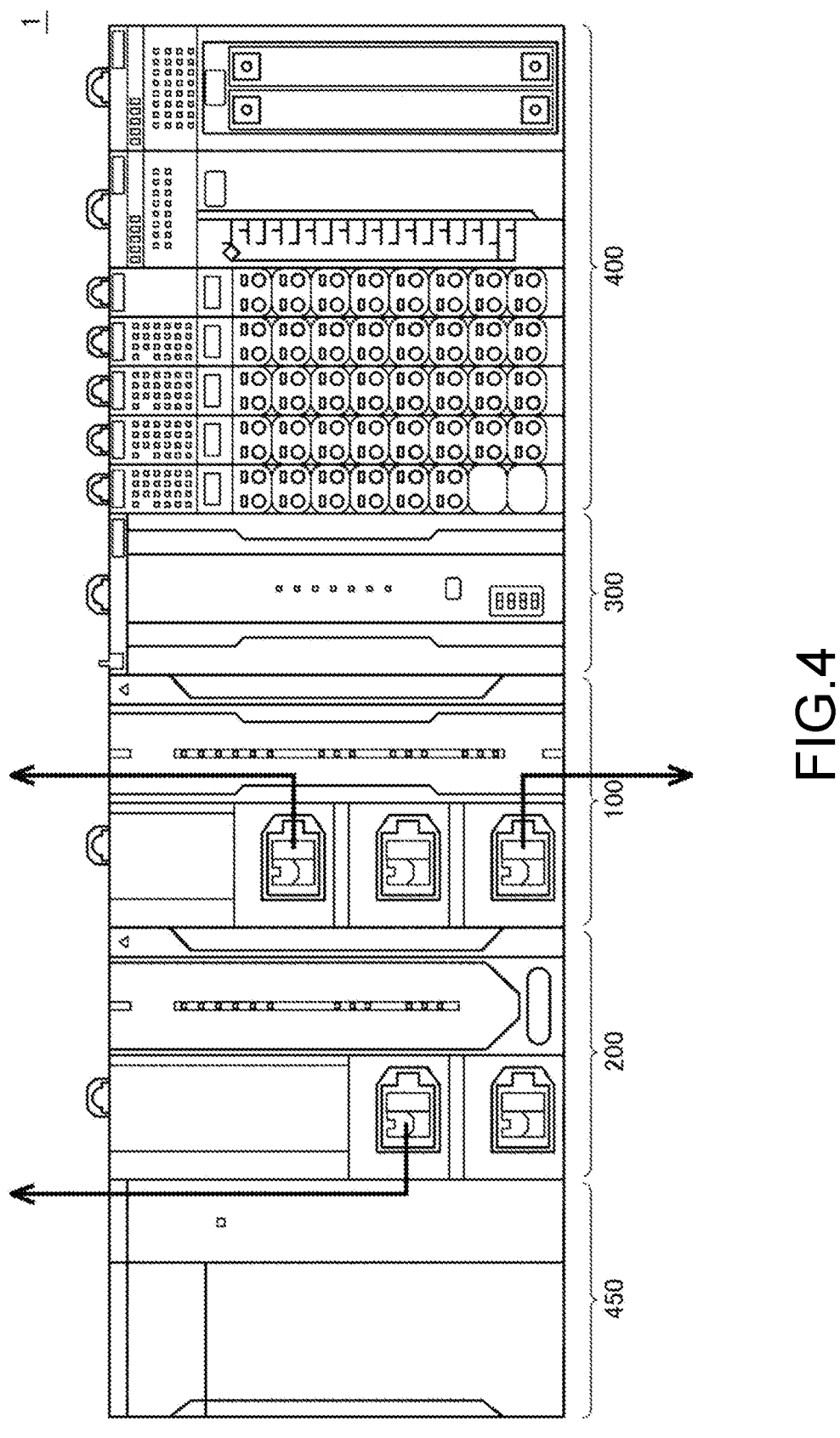
FIG. 4 is a view illustrating an appearance of a configuration example of a controller system 1 according to an embodiment.

FIG. 4 is a view illustrating an appearance of a configuration example of the controller system 1 according to an embodiment. The controller system 1 includes a control unit 100, a security unit 200, a safety unit 300, one or more function units 400, and a power unit 450.

The control unit 100 and the security unit 200 are connected via any data transmission path, such as PCI Express or Ethernet (registered trademark). The control unit 100 and the safety unit 300 as well as the one or more function units 400 are connected via an internal bus not shown herein.

The control unit 100 is an example of the control apparatus performing the control arithmetic operation for controlling the control target, and executes a core process in the controller system 1. The control unit 100 executes the control arithmetic operation for controlling the control target in accordance with arbitrarily designed requirements. Relative to the control arithmetic operation executed by the safety unit 300 described in the following, the control arithmetic operation executed by the control unit 100 is referred to as "standard control". In the configuration shown in FIG. 4, the control unit 100 has one or more communication ports.

The security unit 200 is connected with the control unit 100, and is responsible for the security function with respect to the controller system 1. The security unit 200 is an example of the security monitoring device executing the security protection process. In the configuration shown in FIG. 4, the security unit 200 has one or more communication ports. The security function provided by the security unit 200 will be described in detail in the following.

The safety unit 300 is independent from the control unit 100, and executes the control arithmetic operation for realizing the safety function related to the control target. The control arithmetic operation executed by the safety unit 300 is referred to as "safety control". Normally, "safety control" is designed to meet the requirements for realizing the safety functions defined in IEC 61508. "Safety control" is a general term for processes for preventing human safety from being threatened by equipment or machines.

The function units 400 provide various functions for realizing the control with respect to various control targets by the controller system 1. The function units 400 may typically include an I/O unit, a safety I/O unit, a communication unit, a motion controller unit, a temperature adjustment unit, a pulse counter unit, etc. Examples of the I/O unit include a digital input (DI) unit, a digital output (DO) unit, an analog output unit (AI), an analog output (AO) unit, a pulse catch input unit, and a composite unit in which multiple types are mixed. The safety I/O unit handles an I/O process related to safety control.

The power unit 450 supplies power at a preset voltage to the respective units forming the controller system 1.

<B. Hardware Configuration Example of Respective Units>

In the following, the hardware configuration example of the respective units forming the controller system 1 will be described according to the embodiment.

<b1: Control Unit 100>

Figure 5:
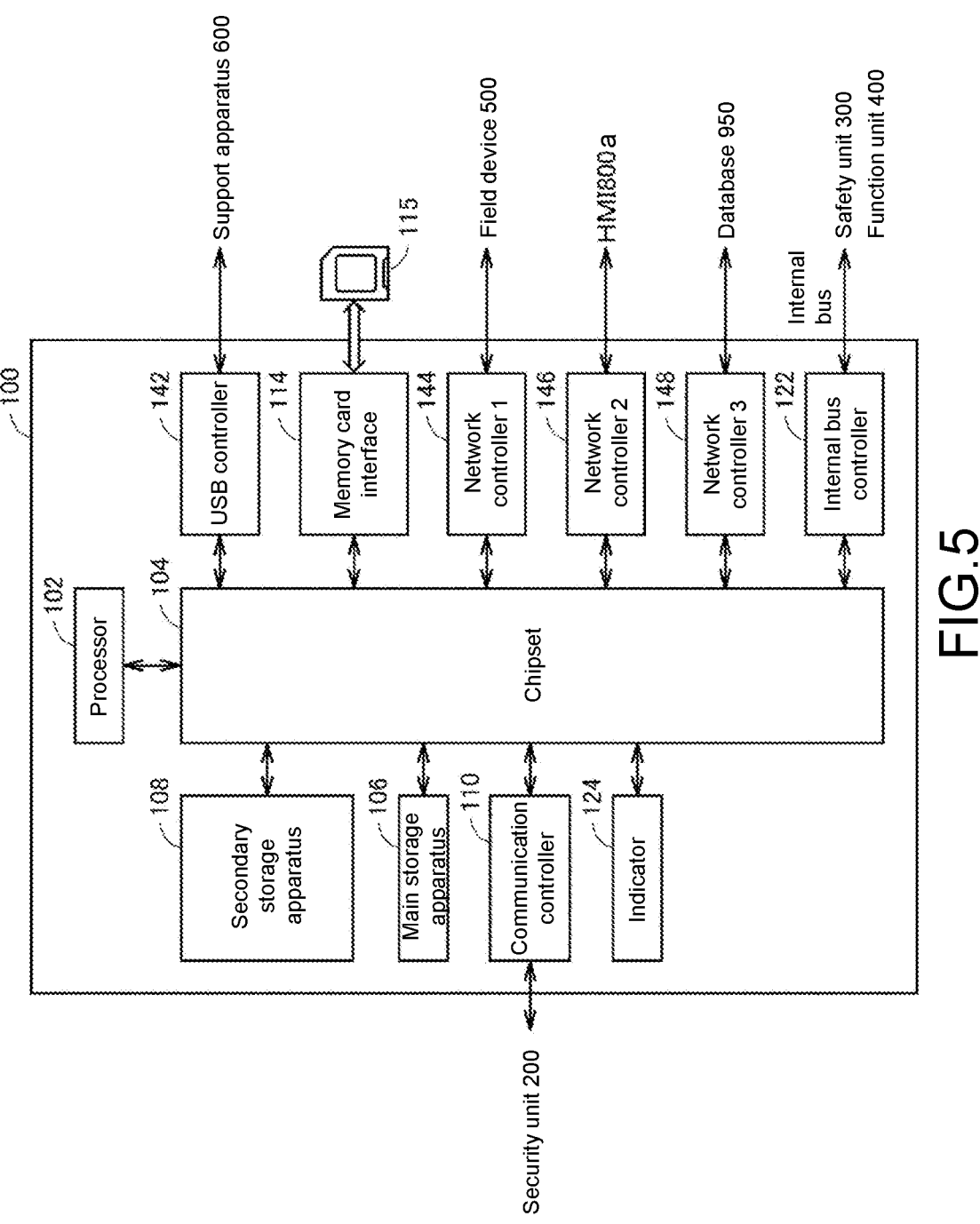
FIG. 5 is a schematic diagram illustrating a hardware configuration example of a control unit 100 constituting the controller system 1 according to an embodiment.

FIG. 5 is a schematic diagram illustrating a hardware configuration example of the control unit 100 constituting the controller system 1 according to an embodiment. The control unit 100 includes, as main components, a processor 102 such as a central processing unit (CPU) or a graphical processing unit (GPU), a chipset 104, a main storage apparatus 106, a secondary storage apparatus 108, a communication controller 110, a universal serial bus (USB) controller 142, a memory card interface 114, network controllers 144, 146, and 148, an internal bus controller 122, and an indicator 124.

By reading various programs stored in the secondary storage apparatus 108 and expanding the programs in the main storage apparatus 106, the processor 102 realizes the control arithmetic operation relating to the standard control as well as various processes to be described in the following. That is, the processor 102 has the function as a program execution part that executes a program. By mediating the data exchange among the processor 102 and the respective components, the chipset 104 realizes the processes of the control unit 100 as a whole.

In addition to the system program, the secondary storage apparatus 108 stores a control program that operates in the execution environment provided by the system program.

The communication controller 110 handles the data exchange with the security unit 200. As the communication controller 110, a communication chip compatible with PCI Express or Ethernet can be adopted, for example.

The USB controller 142 is equivalent to a communication port and handles the data exchange with an arbitrary information processing apparatus via USB connection. Specifically, the USB controller 142 handles the data exchange with a support apparatus 600. The support apparatus 600 is at least able to access the control unit 100 and provides the user with functions such as creating, debugging, and setting various parameters of programs executed by respective units included in the controller system 1a.

The memory card interface 114 is configured so that a memory card 115 is removable, and is capable of writing data of the control program or the respective settings to the memory card 115, or capable of reading data of the control program or the respective settings from the memory card 115.

The network controller 144 handles the data exchange with one or more field devices 500. The field device 500 includes a sensor or a detector which collects various information required for the control arithmetic operation from the control target and an actuator which exerts a function with respect to the control target. The field device 500 includes a robot that exerts an external function with respect to the work, a conveyor that conveys the work, and an I/O unit that exchanges signals with a sensor or an actuator provided in the field.

The network controller 146 handles the data exchange with an HMI 800a. The HMI 800a notifies the operator with various information obtained from the control arithmetic operation in the controller system 1 and generates an internal command, etc., with respect to the controller system 1 in accordance with the operation from the operator.

The network controller 148 handles the data exchange with a database 950. The database 950 collects various data (e.g., information relating to the traceability measured from each work) transmitted from the controller system 1.

Each of the network controllers 144, 146, and 148 is equivalent to a communication port, and may adopt an industrial network protocol, such as EtherCAT (registered trademark), Ethernet/IP (registered trademark), DeviceNet (registered trademark), CompoNet (registered trademark), etc.

The internal bus controller 122 handles the data exchange with the safety unit 300 forming the controller system 1 or the one or more function units 400. In the internal bus, a communication protocol inherently provided by the manufacturer may be used, or a communication protocol same as or compliant with an industrial network protocol may be adopted.

The indicator 124 notifies the action state, etc., of the control unit 100, and is configured as one or more LEDs provided on the unit surface.

In FIG. 5, while a configuration example in which required functions are provided by the processor 102 executing the programs, some or all of the provided functions may also be implemented by using a dedicated hardware circuit (e.g., an application specific integrated circuit (ASIC), or a field-programmable gate array (FPGA), etc.). Alternatively, the main parts of the control unit 100 may be realized by using hardware (e.g., an industrial personal computer based on a general-purpose personal computer) following a general-purpose architecture. In such case, by using virtualization technology, multiple operating systems (OSs) with different purposes may be executed in parallel, and required applications may be executed in the respective OSs.

<b2: Security Unit 200>

Figure 6:
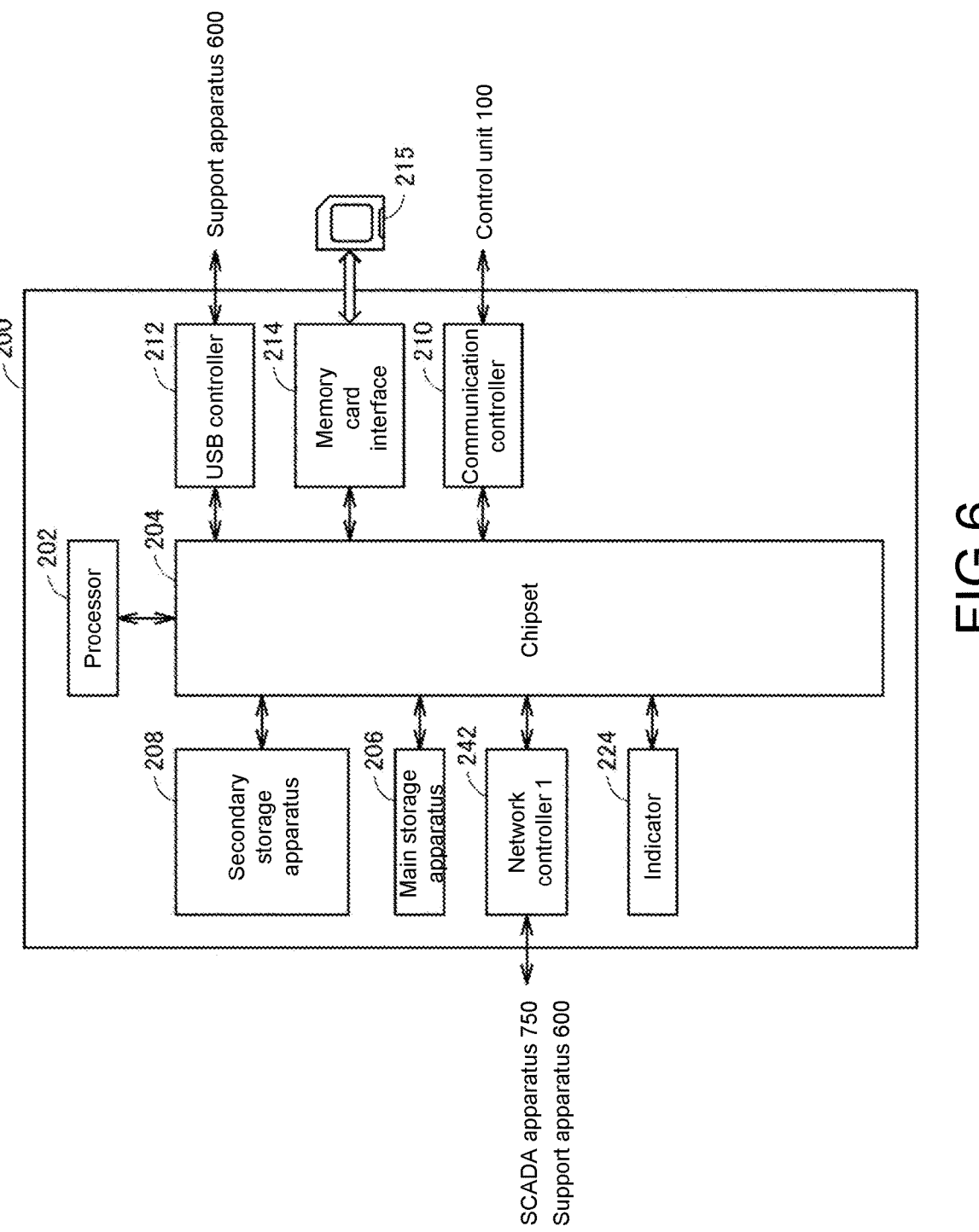
FIG. 6 is a schematic diagram illustrating a hardware configuration example of a security unit 200 constituting the controller system 1 according to an embodiment.

FIG. 6 is a schematic diagram illustrating a hardware configuration example of the security unit 200 constituting the controller system 1 according to an embodiment. The security unit 200 includes, as main components, a processor 202 such as a CPU or a GPU, a chipset 204, a main storage apparatus 206, a secondary storage apparatus 208, a communication controller 210, a USB controller 212, a memory card interface 214, a network controller 242, and an indicator 224.

By reading various programs stored in the secondary storage apparatus 208 and expanding the programs in the main memory apparatus 206, the processor 202 realizes various security functions to be described in the following. By mediating the data exchange among the processor 202 and the respective components, the chipset 204 realizes the processes of the security unit 200 as a whole.

In addition to the system program, the secondary storage apparatus 208 also stores the security system program that operates in the execution environment provided by the system program.

The communication controller 210 handles the data exchange with the control unit 100. As the communication controller 210, like the communication controller 110 in the control unit 100, a communication chip compatible with PCI Express or Ethernet can be adopted, for example.

The USB controller 212 handles the data exchange with an arbitrary information processing apparatus via USB connection. Typically, the USB controller 212 handles the data exchange with the support apparatus 600.

The memory card interface 214 is configured so that a memory card 215 is removable, and is capable of writing data of the control program or the respective settings to the memory card 215, or capable of reading data of the control program or the respective settings from the memory card 215.

The network controller 242 handles the data exchange with an arbitrary apparatus via a network. The network controller 242 may adopt a general-purpose network protocol, such as the Ethernet (registered trademark). Via the network, for example, the support apparatus 600 and the SCADA apparatus 750 may be connected.

The SCADA apparatus 750 notifies the operator with various information obtained from the control arithmetic operation in the controller system 1 and generates an internal command, etc., with respect to the controller system 1 in accordance with the operation from the operator. The SCADA apparatus 750 has a function of collecting data handled by the controller system 1.

The indicator 224 notifies the action state, etc., of the security unit 200, and is configured as one or more LEDs provided on the unit surface.

In FIG. 6, while a configuration example in which required functions are provided by the processor 202 executing the programs, some or all of the provided functions may also be implemented by using a dedicated hardware circuit (e.g., ASIC or FPGA). Alternatively, the main parts of the security unit 200 may be realized by using hardware (e.g., an industrial personal computer based on a general-purpose personal computer) following a general-purpose architecture. In such case, by using virtualization technology, multiple OSs with different purposes may be executed in parallel, and required applications may be executed in the respective OSs.

<b3: Safety Unit 300>

Figure 7:
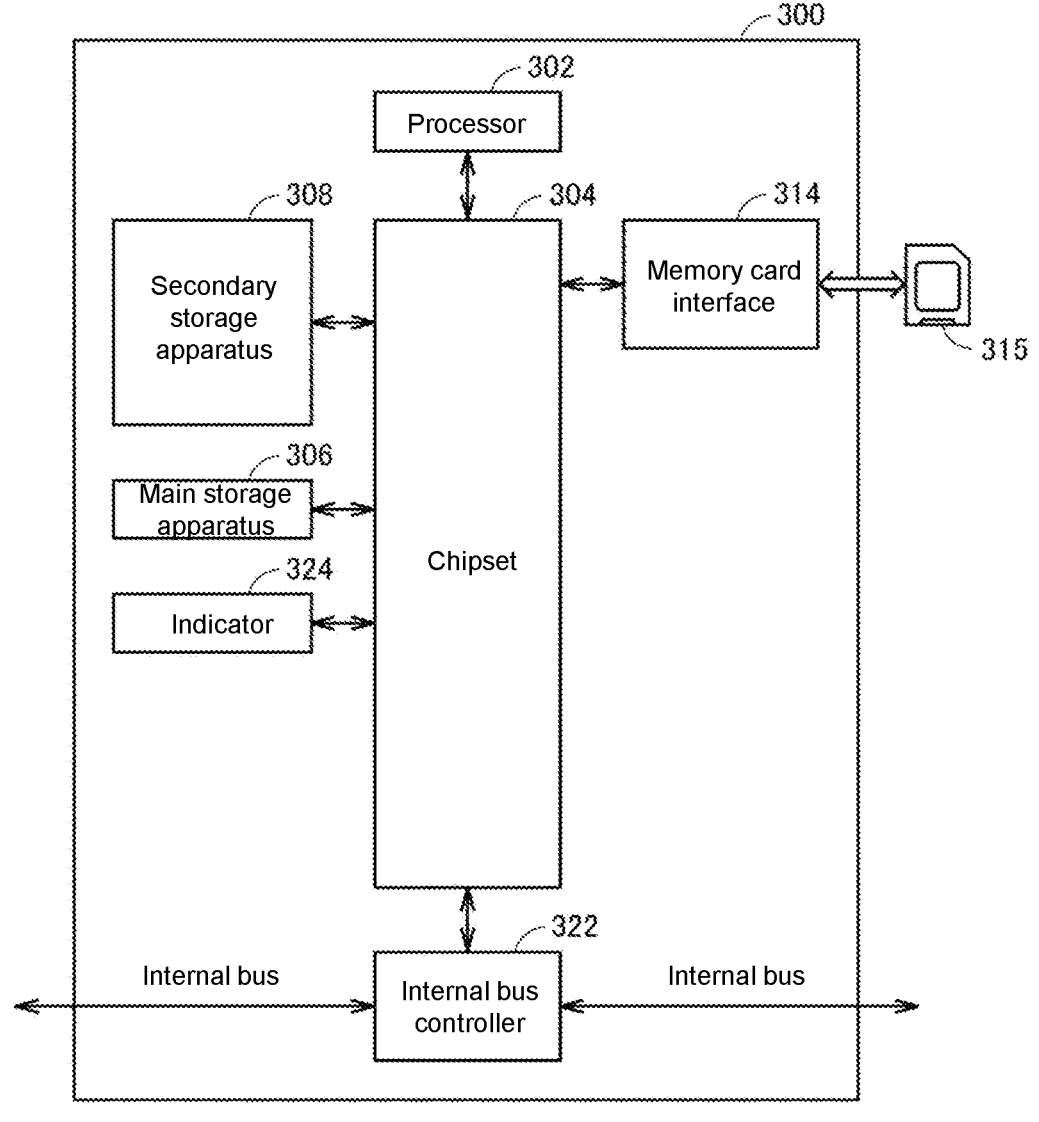
FIG. 7 is a schematic diagram illustrating a hardware configuration example of a safety unit 300 constituting the controller system 1 according to an embodiment.

FIG. 7 is a schematic diagram illustrating a hardware configuration example of the safety unit 300 constituting the controller system 1 according to an embodiment. The safety unit 300 includes, as main components, a processor 302 such as a CPU or a GPU, a chipset 304, a main storage apparatus 306, a secondary storage apparatus 308, a memory card interface 314, an internal bus controller 322, and an indicator 324.

By reading various programs stored in the secondary storage apparatus 308 and expanding the programs in the main memory apparatus 306, the processor 302 realizes the control arithmetic operation relating to safety control as well as various processes to be described in the following. By mediating the data exchange among the processor 302 and the respective components, the chipset 304 realizes the processes of the safety unit 300 as a whole.

In addition to the system program, the secondary storage apparatus 308 stores the safety program that operates in the execution environment provided by the system program.

The memory card interface 314 is configured so that a memory card 315 is removable, and is capable of writing data of the safety program or the respective settings to the memory card 315, or capable of reading data of the safety program or the respective settings from the memory card 315.

The internal bus controller 322 handles the data exchange with the control unit 100 via an internal bus.

The indicator 324 notifies the action state, etc., of the safety unit 300, and is configured as one or more LEDs provided on the unit surface.

In FIG. 7, while a configuration example in which required functions are provided by the processor 302 executing the programs, some or all of the provided functions may also be implemented by using a dedicated hardware circuit (e.g., ASIC or FPGA). Alternatively, the main parts of the safety unit 300 may be realized by using hardware (e.g., an industrial personal computer based on a general-purpose personal computer) following a general-purpose architecture. In such case, by using virtualization technology, multiple OSs with different purposes may be executed in parallel, and required applications may be executed in the respective OSs.

<C. Software Configuration of Controller System 1>

Figure 8:
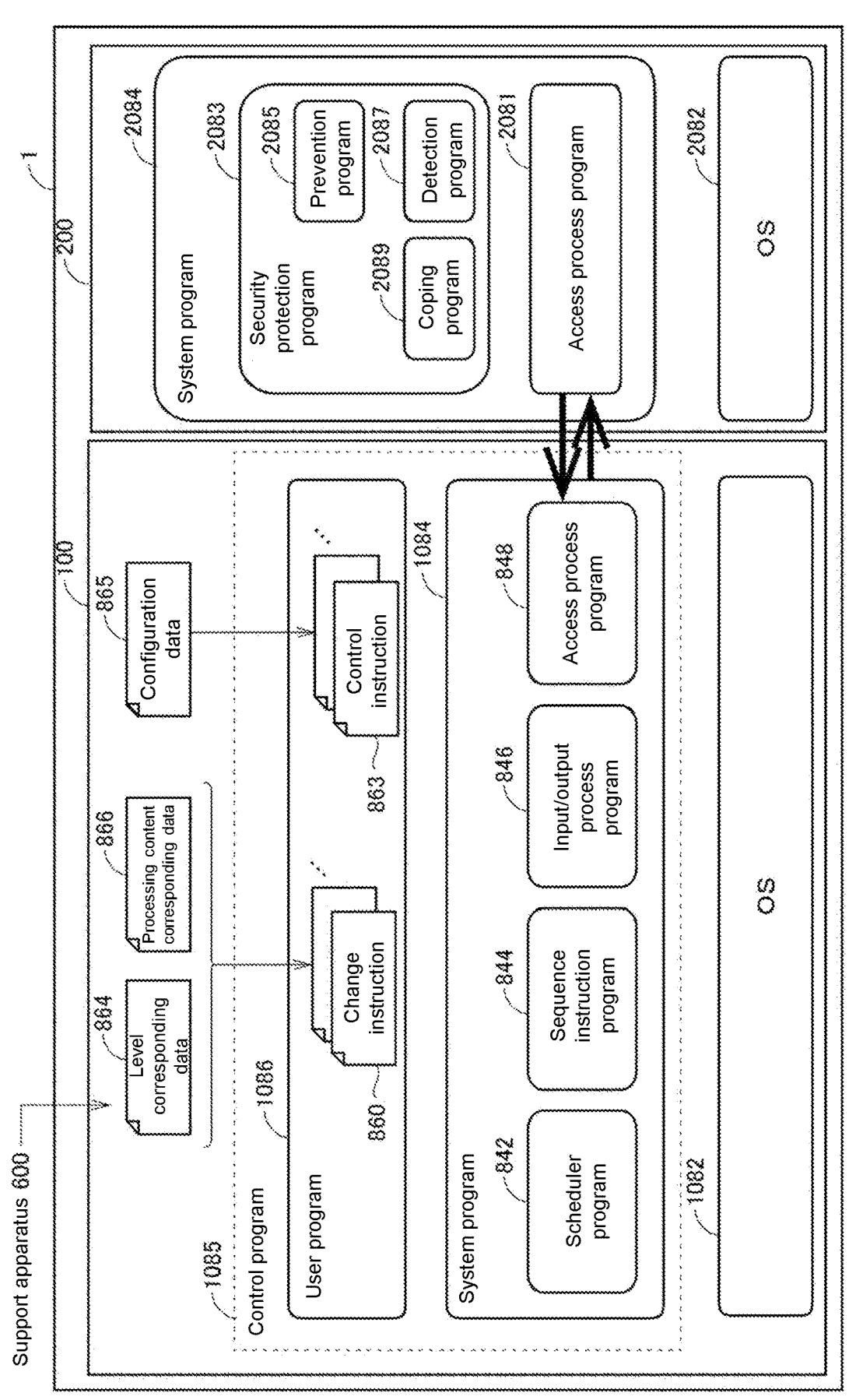
FIG. 8 is a schematic diagram illustrating a software configuration of the controller system 1.

FIG. 8 is a schematic diagram illustrating a software configuration of the controller system 1. In FIG. 8, the descriptions about the safety unit 300, the function units 400, and the power unit 450 are omitted. The instruction codes included in the software group of the control unit 100 shown in FIG. 8 are stored in the secondary storage apparatus 108, read at a suitable timing, and executed by the processor 102. The instruction codes included in the software group of the security unit 200 shown in FIG. 8 are stored in the secondary storage apparatus 208, read at a suitable timing, and executed by the processor 202.

The software executed by the control unit 100, in general, includes an OS 1082, a system program 1084, and a user program 1086. The system program 1084 and the user program 1086 are generally referred to as a control program 1085.

The OS 1082 is designed in correspondence with the computer architecture of the control unit 100, and provides the basic execution environment for the processor 102 to execute the system program 1084 and the user program 1086. The OS 1082 is typically provided by the manufacturer of the controller or a professional software company.

The system program 1084 is a software group for providing functions as the controller system 1. Specifically, the system program 1084 includes a scheduler program 842, a sequence instruction program 844, an input/output program 846, and an access process program 848. Each program included in the system program 1084 is typically provided by the manufacturer of the controller or a professional software company.

The user program 1086 is formed in correspondence with the control purpose of the user. The user program 1086 is formed, for example, in the support apparatus 600. The user program 1086 is transferred from the support apparatus 600 to the control unit 100 via the USB cable, and is stored in the secondary storage apparatus 108.

The user program 1086 realizes the control purpose of the user through cooperating with a sequence instruction program 844. That is, the user program 1086 realizes a programmed action by using the instructions, functions, functional modules provided by the sequence instruction program 844.

The user program 1086 includes one or more change instructions 860. The change instruction is an instruction for changing the contents of the security protection processes executed by the security unit 200. While not shown in FIG. 8, the change instruction 860 includes a first change instruction and a second change instruction. The first change instruction is an instruction for determining the value of the output signal indicating the behavior of the security unit 200 carried out by executing the security protection process with respect to the input signal indicating the action state of the control unit 100. The second change instruction is an instruction indicating the behavior of the security unit 200.

The level corresponding data 864 and the process content corresponding data 866, as the information indicating parameters for executing the change instruction, are sent from the support apparatus 600 in correspondence with the user program 1086. Details about the level corresponding data 864 and the process content corresponding data 866 will be described in detail in the following.

The user program 1086 includes a control instruction 863 for controlling the field device 500, etc., other than the change instruction. Configuration data 865, as the information indicating the parameter for executing the control instruction, is sent from the support apparatus 600 in correspondence with the user program 1086. Details of the configuration data 865 will be described in the following.

The scheduler program 842 makes the processor 102 execute programs in accordance with predetermined priority. The scheduler program 682 controls the start and the interruption of a process as well as the resumption of a process after the process is interrupted for each program executed by the processor 102.

The sequence instruction program 844 includes an instruction code group for calling an entity of the sequence instruction specified in the user program 1086 when the user program 1086 is executed and realizing the contents of the instruction.

The input/output process program 846 is a program for managing the acquisition of input data and the transmission of output data between field devices connected with the control unit 100.

The access process program 848 includes an instruction code group for realizing the process of communicating with another apparatus such as the security unit 200. More specifically, by executing the access process program 848, the control unit 100 outputs the output signal indicating the behavior of the security unit 200 carried out by executing the security protection process and determined when the change instruction is executed to the security unit 200 through the execution of the access process program 848.

The security unit 200, in general, includes an OS 2082 and a system program 2084.

The OS 2082 is designed in correspondence with the computer architecture of the security unit 200, and provides the basic execution environment for the processor 202 to execute the system program 2084. The OS 2082 is typically provided by the manufacturer of the controller or a professional software company.

The system program 2084 includes an access process program 2081 and a security protection program 2083.

The access process program 2081 includes an instruction code group for realizing the process of communicating with another apparatus such as the control unit 100.

The security protection program 2083 includes a prevention program 2085, a detection program 2087, and a coping program 2089. The security protection program 2083 includes an instruction code group for executing each of the prevention program 2085, the detection program 2087, and the coping program 2089 in accordance with the output signal indicating the behavior of the security unit 200, transmitted from the control unit 100, and obtained through the execution of the access process program 2081.

The security unit 200 executes each program included in the security protection program 2083 in accordance with the output signal indicating the behavior of the security unit 200 and output from the control unit 100.

<D. Security Protection Process Executed by the Security Unit 200>

The security unit 200 is responsible for the security function with respect to the controller system 1 and executes the security protection process with respect to the controller system 1. For the control unit 100, a security event may occur in various situations (as shown in FIG. 2). The security unit 200 executes the security protection process, including the prevention with respect to the security event that may occur in the control unit 100, the detection of the security event, and coping with the detected security event, in the respective situations.

The security unit 200 is capable of executing security protection processes respectively corresponding to multiple predetermined security levels. In addition, the security protection process is executed in correspondence with one of the security levels in accordance with at least one of the action state of the control unit 100 and the notification issued by the control arithmetic operation executed by the control unit 100.

Figure 9:
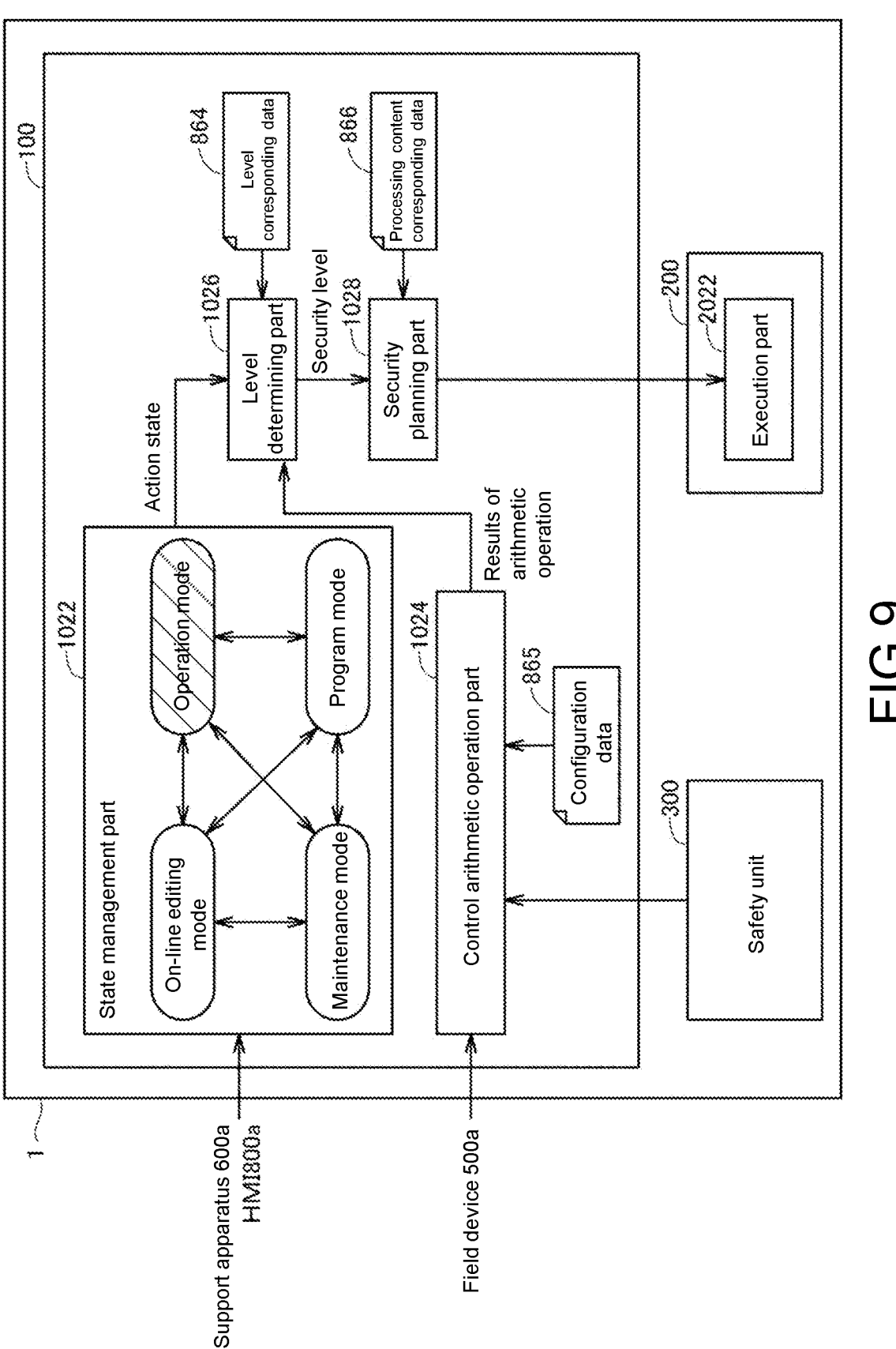
FIG. 9 is a functional configuration diagram schematically illustrating security functions of the controller system 1.

FIG. 9 is a functional configuration diagram schematically illustrating security functions of the controller system 1. The functions of the control unit 100 shown in FIG. 9 are realized by executing the respective programs shown in FIG. 8 by the processor 102. In addition, the functions of the security unit 200 shown in FIG. 9 are realized by executing the respective programs shown in FIG. 8 by the processor 202.

The control unit 100 includes a state management part 1022, a control arithmetic operation part 1024, a level determining part 1026, and a security planning part 1028.

The state management part 1022 manages the action state of the control unit 100. The action states are states controlled through execution of the system program 1084 which is installed in advance in the control unit 100 and provides functions as the control unit 100. That is, the action states of the control unit 100 are states defined by the manufacturer of the control unit 100. In addition, the state management part 1022 may also be considered as functions expressed by executing the system program 1084.

Typically, the action states of the control unit 100 can be classified into a state in which the control program provided in the control unit 100 is executed and a state in which the control program is not executed, or a state in which rewriting of the control program is permitted and a state in which the rewriting is not permitted.

In the embodiment, control is exerted in one of the four action states, i.e., the "program mode", the "operation mode", the "on-line editing mode", and the "maintenance mode".

The "program mode" is an action state controlled during a period before the user program 1086 is installed to the control unit 100 until the installation is completed and the control unit does not execute a program. For example, the "program mode" is an action state when the control unit 100 is shipped or an action state controlled when the control program of the control unit 100 is rewritten.

The "operation mode" is an action state controlled when the control unit 100 is executing a program, and is a mode controlled when equipment or a machine is in operation.

The "on-line edit mode" is an action state able to rewrite the control program during execution of the control program.

The "maintenance mode" is an action state in which the control unit 100 does not execute a program, and the program of the control unit 100 is able to be rewritten.

As an example of these action states, the types of the action states which the control unit 100 controls may include fewer than four types, one type, and five or more types. In addition, it is not required that the control unit 100 necessarily includes the action states shown in FIG. 9.

The statement management part 1022 controls the action state in correspondence with the met condition of switching the action state when the condition is met. The statement management part 1022 notifies the level determining part 1026 that the action state is switched. The state management part 1022, for example, typically switches the action state in the case of detecting a command of switching the state from the support apparatus 600, an internal command generated in the HMI 800a, or an operation with respect to a key switch (not shown) provided in the control unit 100.

The control arithmetic operation part 1024 performs the control arithmetic operation for controlling the work as the control target. The control arithmetic operation part 1024 executes the control arithmetic operation in accordance with the configuration data 865 and the input value output from the field device 500 or the safety unit 300 communicably connected with the control unit 100.

The configuration data 865 includes the setting information required for executing the control arithmetic operation, such as including the assignment of variables used in the program with respect to the signal assigned to the I/O unit.

The level determining part 1026 determines a security level in accordance with the input value from the state management part 1022 or the control arithmetic operation part 1025 and the level corresponding data 864. The level determining part 1026 notifies the security planning part 1028 about the determined security level.

FIG. 10 is a diagram illustrating a data configuration of the level corresponding data 864. Referring to FIG. 10, the level corresponding data 864 includes the assignment of the security level to the input value input from the statement management part 1022 and the control arithmetic operation part 1024. More specifically, the security level is assigned with respect to the action state or a variable indicating the arithmetic operation result. Examples of the arithmetic operation result include, for example, the output of an abnormal signal.

Referring to FIG. 9 again, the security planning part 1028 specifies the contents of the security protection process whose contents correspond to the security level, and instructs the security unit 200 to execute the security protection process with the specified contents. The security planning part 1028 specifies the contents of the security protection process in accordance with the security level notified from the level determining part 1026 and the process content corresponding data 866.

FIG. 11 is a diagram illustrating a data configuration of the process content corresponding data 866. Referring to FIG. 11, the contents of the security protection process are defined in correspondence with each of multiple predetermined security levels.

For example, as shown in FIG. 11, the process content corresponding data 866 defines, for each security level, the information whose output is limited and the output destination which is limited among the information output from the control unit 110, and the information whose input is limited and the target able to transmit information to the control unit 100 among the information input from an apparatus connected to the control unit 100, as the prevention means against the security event.

Also, the process content corresponding data 866 may also define, for each security level, a threshold at which and a detection target for which a security event is determined as occurring, as a detection means of the security event.

In addition, the process content corresponding data 866 may also define, for each security level, among the information output from the control unit 100, the information whose output is limited, the output destination which is limited, the information input to the limited control unit 110, and the target able to transmit information to the control unit 100, in the case in which the security event is detected, as a coping means in correspondence with the detected security event. In addition, the processing content corresponding data 866 may also define, for each security level, a means for notifying a security event in the case where the security event occurs.

The security unit 200 has an execution part 2022. The execution part 2022 executes the security protection process with the contents specified by the security planning part 1028. Specifically, the execution part 2022 carries out the protection against the security event by using the prevention means that is defined, detects the security event by using the detection means that is defined, and copes with the detected security event by using the coping means that is defined.

For example, in the embodiment, the security unit 200 exhibits the following behaviors in correspondence with the action states of the control unit 100. In the "operation mode" in which the control program is executed, a security level 2 is set, and the communication with a superordinate apparatus, such as the database 950 is set to be enabled. Accordingly, the operation logs collected when the program is executed can be uploaded to the database 950 at all times. At this time, to lower the risk of leaking the information in operation to the outside, the communication via VPN is disabled.

In addition, in the "program mode" in which the rewriting of the control program of the control unit 100 is permitted, the communication with the superordinate apparatus, such as the database 950, and the communication via the VPN are both disabled. Accordingly, the control program can be prevented from being rewritten unintentionally.

In addition, in the case in which the result of the control arithmetic operation indicate an abnormality, by enabling the communication via VPN, an environment capable of remote maintenance is provided.

Here, the series of processes of changing the behavior of the security unit 200 when the security protection process is executed in accordance with the input value from the state management part 1022 are realized by executing the first change instruction to be described afterwards. Meanwhile, the series of processes of changing the behavior of the security unit 200 when the security protection process is executed in accordance with the input value from the control arithmetic operation part 1024 are realized by executing the second change instruction to be described afterwards.

<E. Hardware Configuration Example of Support Apparatus>

Figure 12:
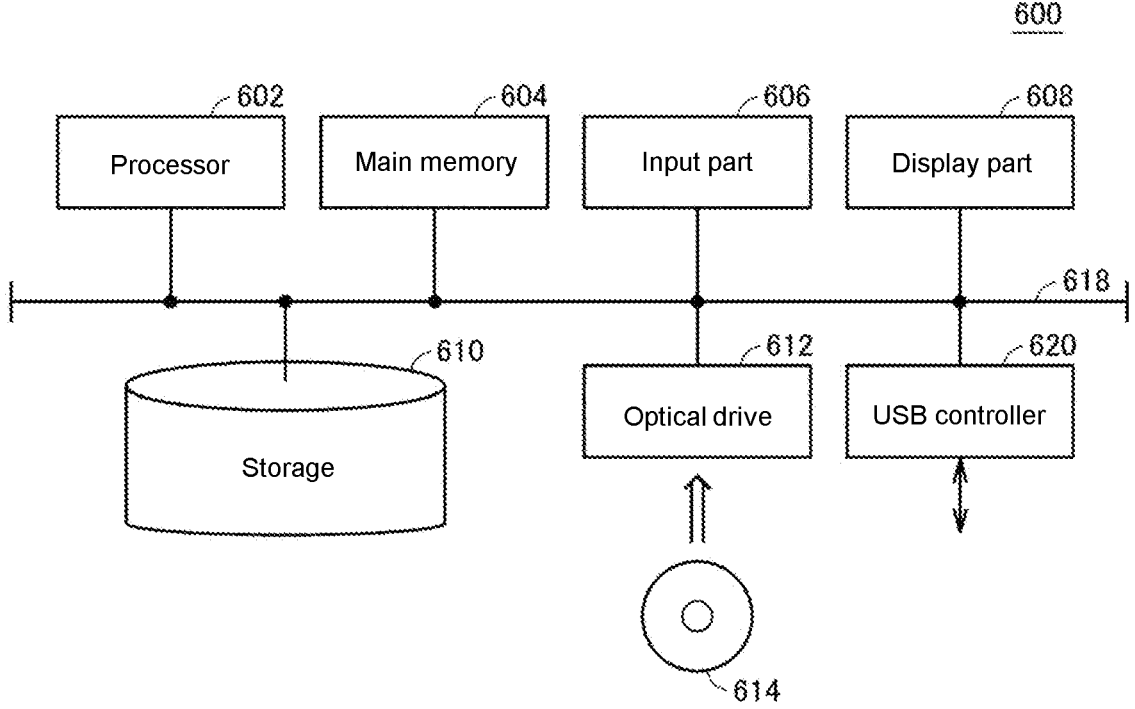
FIG. 12 is a schematic diagram illustrating a hardware configuration example of a support apparatus 600.

FIG. 12 is a schematic diagram illustrating a hardware configuration example of the support apparatus 600. The support apparatus 600 provides the function of forming the user program including the change instruction. More specifically, the support apparatus 600 provides the user interface for selecting the change instruction. As an example, the support apparatus 600 is realized by using hardware (e.g., a general-purpose personal computer) following a general-purpose architecture.

Referring to FIG. 12, the support apparatus 600 includes a processor 602, a main memory 604, an input part 606, a display part 608, a storage 610, an optical drive 612, and a USB controller 620. These components are connected via a processor bus 618.

The processor 602 is configured by a CPU or a GPU, etc., provides the user interface for selecting the change instruction by reading the program stored in the storage 610 and expanding the program in the main memory 604, and forming the user program 1086 in accordance with the operation by the user.

The main memory 604 is configured by a volatile storage apparatus, such as a DRAM or a SRAM. The storage 610 is configured by a non-volatile storage apparatus, such as an HDD or an SSD.

In addition to the OS for realizing basic functions, the storage 610 stores the support program for providing functions as the support apparatus 600.

The input part 606 is configured by a keyboard or a house, etc., and receives a user operation. The display part 608 is configured by a display, etc., and outputs processing results from the processor 602.

The USB controller 620 exchanges data with the controller system 1, etc., via USB connection.

The support apparatus 600 has the optical drive 612, and reads a program stored non-transiently in a computer-readable recording medium 614 (e.g., an optical recording medium such as a digital versatile disc (DVD)) from the computer-readable recording medium 614 to install the computer-readable recording medium 614 in the storage 610, etc.

A support program 6140, etc., executed by the support apparatus 600 may also be installed via the computer readable recording medium 614, and may also be installed by being downloaded from a sever apparatus on the network, etc. In addition, the functions provided by the support apparatus 600 according to the embodiment may also be realized by using a portion of the module provided by the OS.

While a configuration example in which required functions as the support apparatus 600 are provided by the processor 602 executing the program in FIG. 12, some or all of the provided functions may also be implemented by using a dedicated hardware circuit (e.g., ASIC or FPGA)

<F. User Interface Provided by the Support Apparatus 600>

The support apparatus 600 provides a user interface for the user to form the user program 1086 including the change instruction. More specifically, with the processor 602 of the support apparatus 600 executing the program stored in the storage 610, the user interface shown in FIGS. 13 to 16 is displayed on the display part 608, and the user program 1086 including the change instruction in accordance with the setting received by the input part 606 as well as the level corresponding data 864 and the processing content corresponding data 866 required for executing the change instruction are generated.

Figure 13:
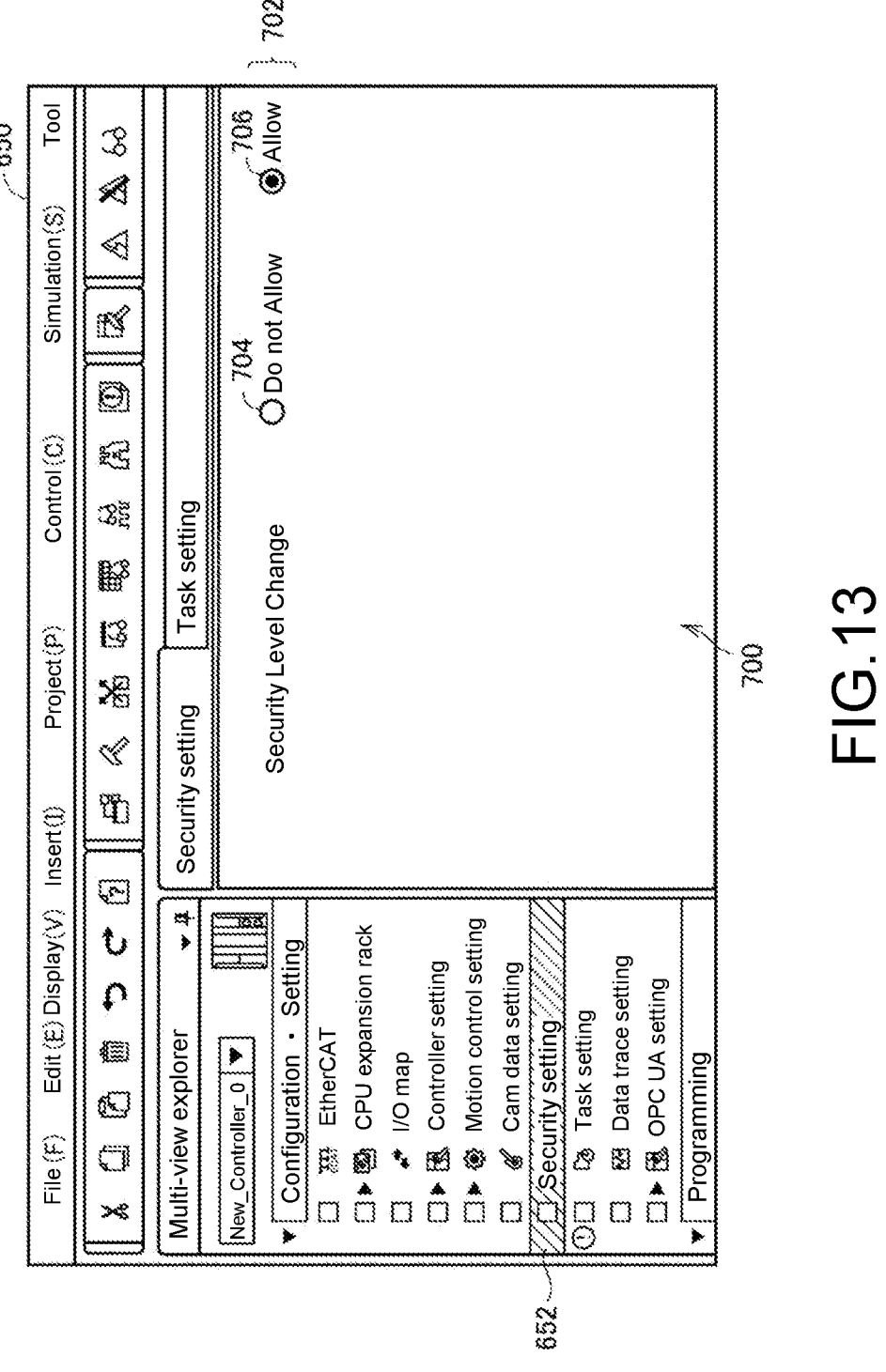
FIG. 13 is a diagram illustrating an example of a user interface receiving selection of a change instruction.
Figure 14:
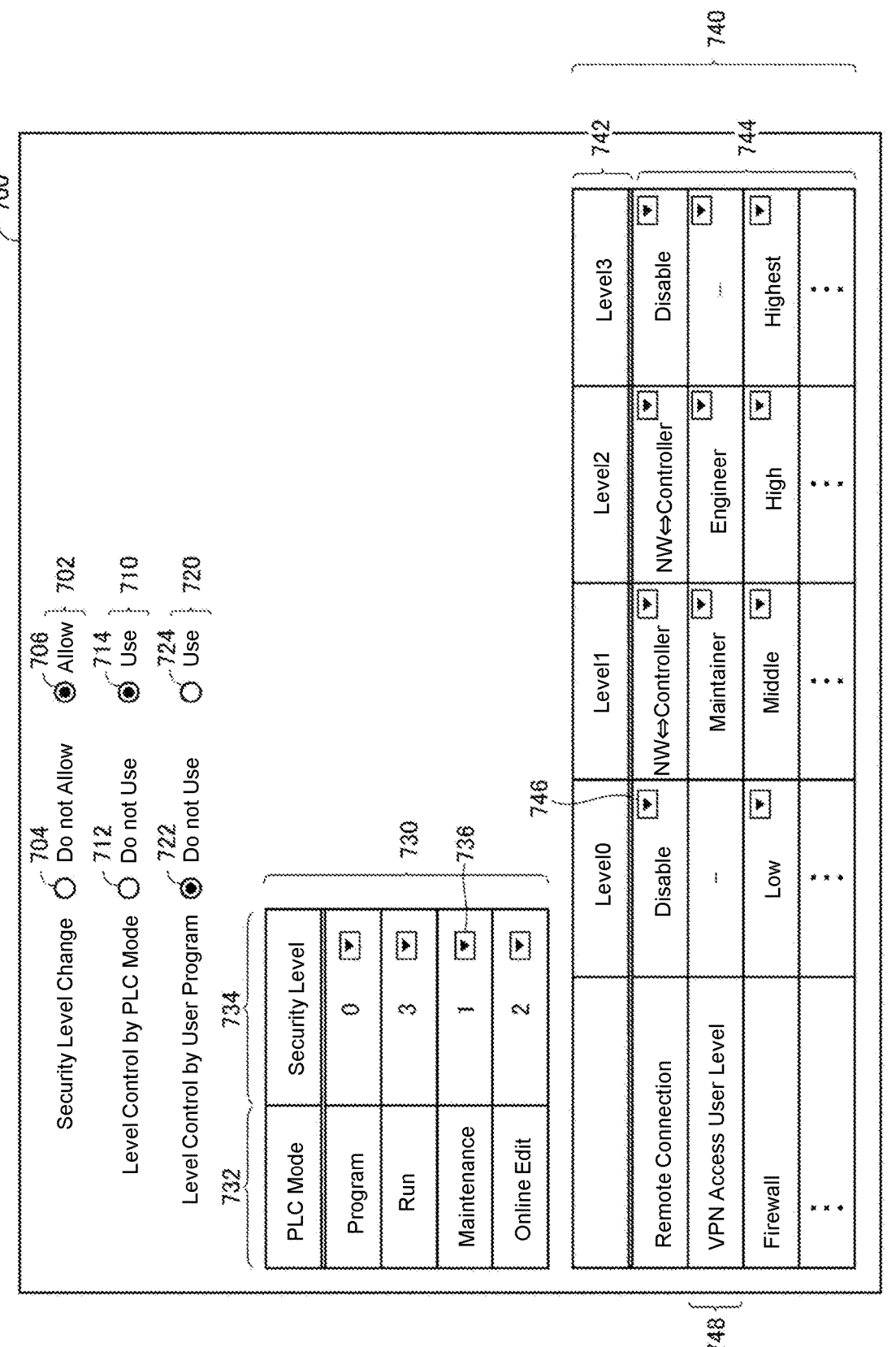
FIG. 14 is a diagram illustrating an example of a user interface provided when a change instruction is selected.
Figure 16:
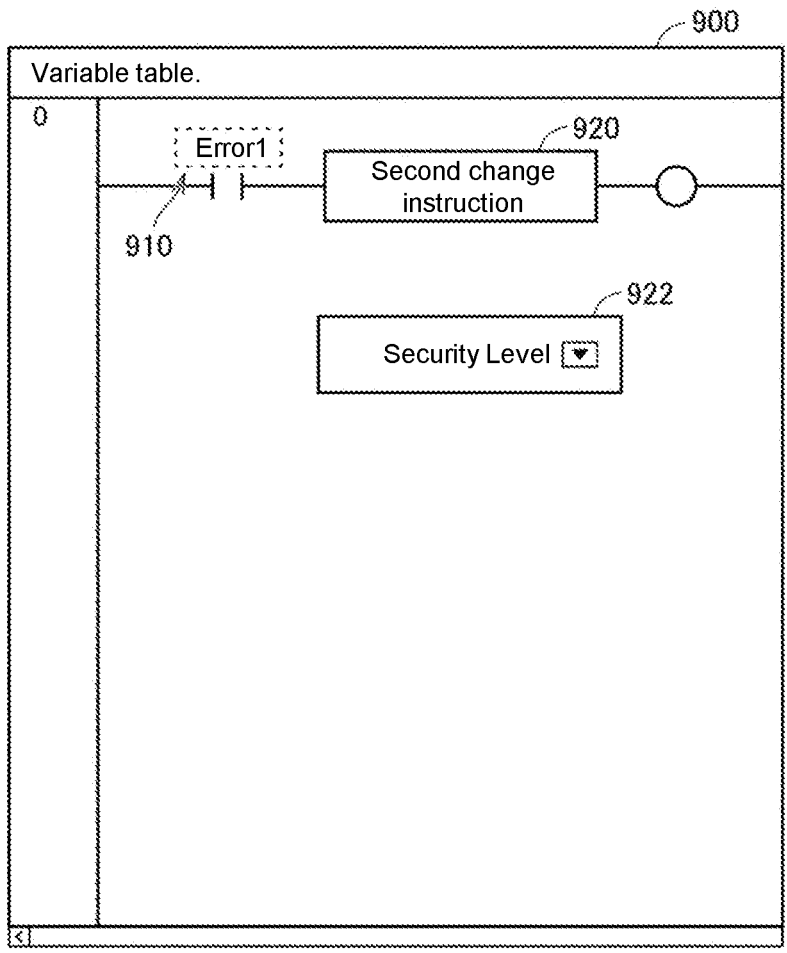
FIG. 16 is a diagram illustrating an example of a user interface receiving setting of an execution condition of a change instruction.

FIG. 13 is a diagram illustrating an example of a user interface receiving selection of a change instruction. FIG. 14 is a diagram illustrating an example of a user interface provided when a change instruction is selected. FIG. 15 is a diagram illustrating an example of a user interface for setting contents of a connection condition for connection with an outside network. FIG. 16 is a diagram illustrating an example of a user interface receiving setting of an execution condition of a change instruction.

Referring to FIG. 13, in a user interface 650, when a security setting tab 652 on the left side of in the figure is selected, a setting screen 700 is displayed in the region on the right side. The setting screen 700 has a selection region 702 for selecting the change instruction for receiving the selection of the change instruction. In the selection region 702, a tab 704 indicating that the change instruction is not selected and a tab 706 indicating that the change instruction is selected are displayed. In FIG. 13, a portion of the user interface 650 is omitted.

Referring to FIG. 14, when the tab 706 is selected, a first selection region 710 and a second selection region 720 for selecting the change instructions are provided for each of the two types of change instructions in the setting screen 700.

The first selection region 710 receives the selection of the first change instruction. The first change instruction is an instruction for determining the value of the output signal indicating the behavior of the security unit 200 carried out by executing the security protection process with respect to the input signal indicating the action state of the control unit 100. In the first selection region 710, a tab 712 indicating that the first change instruction is not selected and a tab 714 indicating that the first change instruction is selected are displayed.

The second selection region 720 receives the selection of the second change instruction. The second change instruction is an instruction that defines the behavior of the security unit 200 carried out by executing the security protection process. The second change instruction is executed when a condition arbitrarily set by the user is met. In the second selection region 720, a tab 722 indicating that the second change instruction is not selected and a tab 724 indicating that the second change instruction is selected are displayed.

Referring to FIG. 14, when the tab 714 is selected, a level corresponding region 730 for associating the action state of the control unit 100 with the security level is provided. The level corresponding region 730 includes a state displaying region 732 in which the action state of the control unit 100 is defined and a level input region 734 in which the input of the security level corresponding to the action state displayed in the action display region 732 is received. When the tab 736 of the level input region 734 is selected, one of multiple levels can be selected. It is also possible to add a level. Since the action state of the control unit 100 displayed in the state display region 732 is predetermined, the display of the state display region 732 in general does not change.

Since the contents of the security protection process are set in correspondence with each security level, the level corresponding region 730 can be considered as a region receiving the setting of the corresponding relationship between the input signal indicating the action state of the control unit 100 and the output signal indicating the behavior of the security unit 200 carried out by executing the security protection process.

Referring to FIG. 14, when the tab 714 is selected, in addition to the level corresponding region 730, a setting content corresponding region 740 for setting the contents of the security protection process for each security level is provided. The setting content corresponding region 740 includes a level region 742 indicating the security level and a setting content input region 744 receiving the setting of the contents of the security protection process for each level.

A tab 746 for selecting the setting contents is provided in each cell in the setting content input region 744. By selecting the tab 746, the user interface for selecting the setting contents is provided.

Since the setting content corresponding region 740 receives the setting of the contents of the security protection process for each security level equivalent to the output signal, the setting content corresponding region 740 is equivalent to the user interface for setting the behavior of the security unit 200 indicated by the output signal.

The setting content input region 744 includes a permitted condition input region 748 receiving the setting of the permitted condition in the case where the communication via the outside network is permitted. The contents of the specific permitted condition which each permitted condition ("Maintainer", "Administrator", "Engineer") in the permitted condition input region 748 are set by operating a permitted condition setting screen 800.

Referring to FIG. 15, the permitted condition setting screen 800 provides a condition change selection region 810 which receives the selection of the permitted condition change instruction for changing the permitted condition for each level and an permitted condition setting region 820 for setting the permitted condition in the case where the selection of the permitted condition change instruction is carried out.

The condition change selection region 810 includes a tab 812 indicating that the permitted condition change instruction is not selected and a tab 814 indicating that the permitted condition change instruction is selected. When the tab 814 is selected, the permitted condition setting region 820 is provided.

The permitted condition setting region 820 includes a condition item region 822 in which a condition item is presented and a condition input region 824 in which, for each user name, the input of each condition item is received. In "VPN Group", an arbitrary group name can be input. The group name is associated with the group name set in the permitted condition input region 748 shown in FIG. 14. For example, in the case where "Engineer" is input in the permitted condition input region 748, it is possible to connect with the control unit 100 via the VPN by using the respective conditions set as "User_CCC", "User_DDD", "User EEE" in FIG. 15.

Referring to FIG. 16, when the tab 724 in FIG. 14 is selected, that is, when the second change instruction is selected, a variable table screen 900 as a user interface for setting the execution condition of the second change instruction is provided.

The variable table screen 900 receives the input of a ladder program. For example, the ladder program shown in FIG. 16 indicates that the execution condition of the second change instruction is met when a variable referred to as Error 1 is output.

With the user inputting an arbitrary variable 910 or combining contact points, the execution condition of the second change instruction can be set.

In addition, in the case where an instance block 920 is clicked on, a level selection tab 922 for selecting of which security level the security protection process is to be executed is provided. In the case where the instant block 920 is clicked on, a variable table for inputting the instruction content of the second change instruction may be provided.

The user interface shown in FIGS. 13 to 16 is merely an example and may also be realized in a different form.

<G. Software Configuration of Support Apparatus 600>

Figure 17:
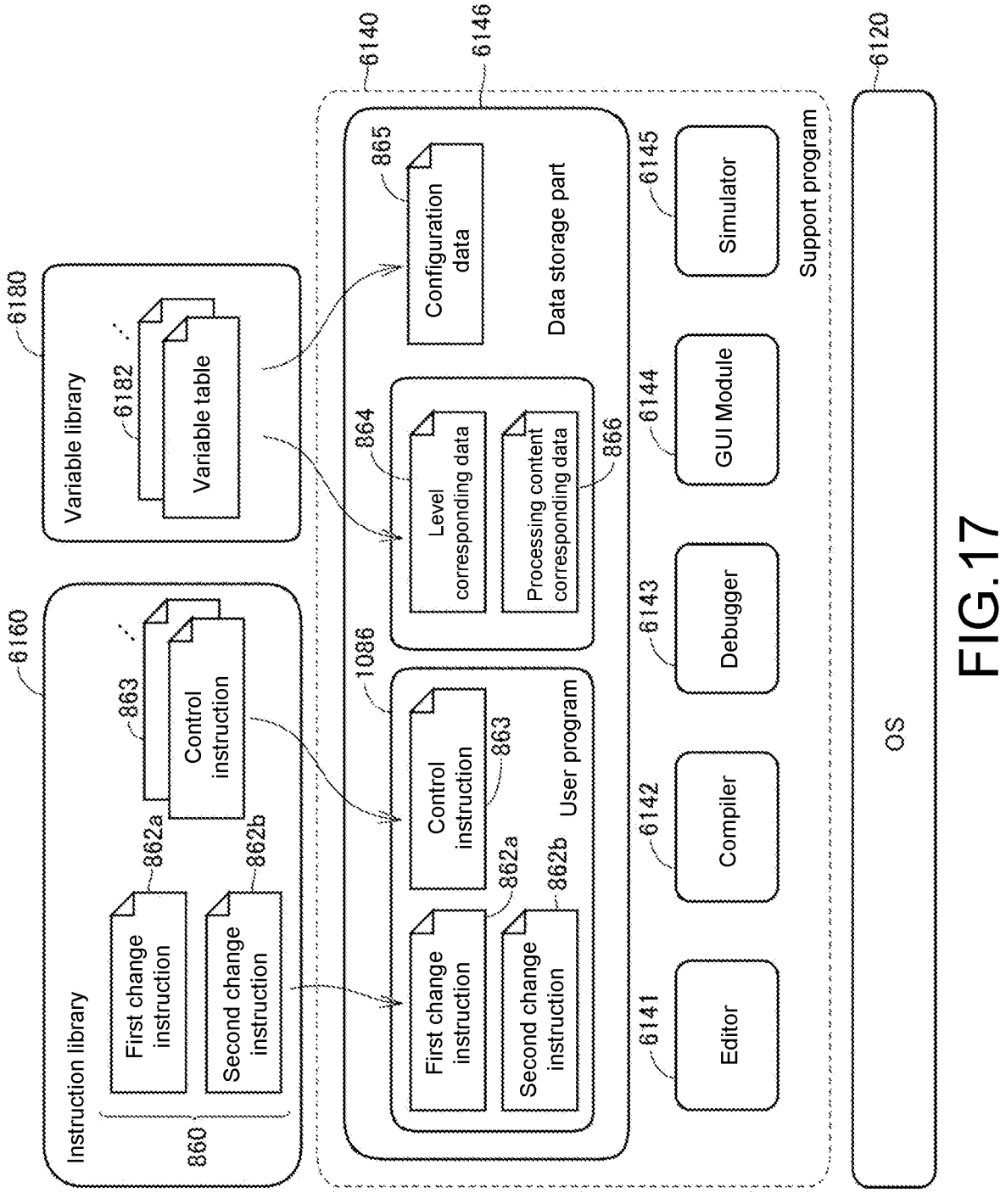
FIG. 17 is a schematic diagram illustrating a software configuration of the support apparatus 600.

FIG. 17 is a schematic diagram illustrating a software configuration of the support apparatus 600. In FIG. 17, an example of a software group for the support apparatus 600 to provide respective functions is shown. The instruction codes included in the software group are read at a suitable timing and executed by the processor 602 of the support apparatus 600.

The software executed by the support apparatus 600 at least includes an OS 6120 and the support program 6140. The programs are stored in the storage 610. In addition, the data used for executing the programs include an instruction library 6160 and a variable library 6180 and are stored in the storage 610.

The OS6120 provides a basic environment in which the support program 6140 can be executed. The support program 6140 is a program for realizing the functions provided by the support apparatus 600, and provides a function for forming the user program 1086.

The instruction library 6160 stores instructions which are program components defined for each instruction information for forming the user program 1086. The instructions stored in the instruction library 6160 includes the change instruction 860 and the control instruction 863. The change instruction 860 includes a first change instruction 862a and a second change instruction 862b. When the user selects the first change instruction 862a, the first change instruction 862a is incorporated into the user program 1086. Similarly, when the user selects the second change instruction 862b, the second change instruction 862b is incorporated into the user program 1086.

The variable library 6180 includes a variable table 6182 defining parameters required for execution of the change instruction. In the case where the first change instruction 862a is selected, a variable table corresponding to the first change instruction 862a is called and input to the display part 608, and the level corresponding region 730 and the setting content corresponding region 740 shown in FIG. 14 are provided.

When information is input to the level corresponding region 730 and the setting content corresponding region 740, the support program 6140 generates the level corresponding data 864 and the processing content corresponding data 866 and stores the level corresponding data 864 and the processing content corresponding data 866 in the data storage part 6146. In the case where the control instruction 863 is selected, the variable table corresponding to the selected control instruction is called and output to the display part

608. When variables are input, the configuration data 865 is generated and stored in the data storage part 6146.

The instruction library 6160 and the variable library 6180 are, for example, distributed in a state of being stored in the recording medium 614 by a controller manufacturer or a professional software company, etc. The user can make use of the instruction library 6160 and the variable library 6180 by installing the instruction library 6160 and the variable library 6180 stored in the recording medium 614 to the support apparatus 600.

The user program 6140 includes an editor 6141, a compiler 6142, a debugger 6143, a graphical user interface (GUI) module 6144, a simulator 6145, and a data storage part 6146.

The editor 6141 provides inputting and editing functions, etc., for forming a source program of the user program 1086. More specifically, the editor 6141 provides functions of preserving and editing the formed source program in addition to the function that the user operates the input part 606 configured by a keyboard or a mouse to form the source program of the user program 1086. The editor 6141, in correspondence with the designer's operation, forms the source program of the user program 1086 by using the change instruction selected from the instruction library 6160.

The compiler 6142 provides functions of compiling the source program and generating the user program 1086 in the form of a program executable by the control unit 100.

The debugger 6143 provides a function for performing debugging with respect to the source program of the user program 1086.

The GUI module 6144 has a function of providing a user interface screen for the designer to input various data or parameters. The user interface screen is displayed on the display part 608.

The simulator 6145 constructs an environment for simulating the execution of the program by the control unit 100 in the support apparatus 600.

The user program 1086 that is formed is stored in the data storage part 6146. The user program 1086 includes one or more instructions. The user program 1086, the level corresponding data 864, the processing content corresponding data 866, and the configuration data 865, etc., stored in the data storage part 6146 are transmitted to the control unit 100 via a USB cable and set in the control unit 100.

While the instruction library 6160 and the variable library 6180 are stored in the storage 610 of the support apparatus 600 in the example shown in FIG. 17, at least one of the instruction library 6160 and the variable library 6180 may also be stored in a server apparatus connectible with the support apparatus 600 via a network.

<H. Flowchart>
<h1. Flowchart Executed by Control Unit>

Figure 18:
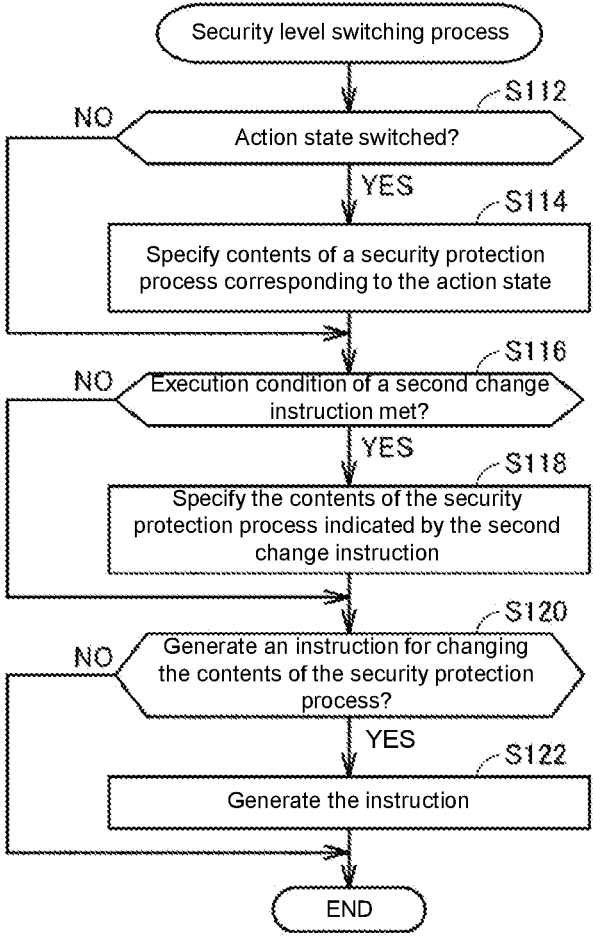
FIG. 18 is a flowchart illustrating an example of a security level switching process executed by the control unit 100.

A security level switching process executed by the control unit 100 is described with reference to FIG. 18. FIG. 18 is a flowchart illustrating an example of the security level switching process executed by the control unit 100.

In Step S112, the processor 102 determines whether the action state of the control unit 100 is switched.

In the case of determining that the action state is not switched ("NO" in Step S112), the processor 102 switches the control to Step S116. In the case of determining that the action state is switched ("YES" in Step S112), the processor 102 specifies the security level corresponding to the action state in Step S114.

In Step S116, the processor 102 determines whether the execution condition of the second change instruction is met.

That is, the processor 102 determines whether to perform a security level change in correspondence with a notification issued through the control arithmetic operation.

In the case where the execution condition of the second change instruction is not met ("NO" in Step S116), the processor 102 switches the process to Step S120. In the case where the execution condition of the second change instruction is met ("YES" in Step S116), the processor 102 specifies the contents of the security protection process indicated by the second change instruction.

In Step S120, the processor determines whether to generate the instruction for changing the contents of the security protection process. Specifically, if "NO" in both Step S112 and Step S116, the processor 102 determines to not generate the instruction ("NO" in Step S120) and ends the security level switching process.

In the case where the processor 102 determines to generate the instruction for changing the contents of the security protection process ("YES" in Step S120), in Step S122, the instruction for changing the contents of the security protection process is generated, and in Step S124, the security unit 200 is notified with the generated instruction, and the process is ended. In the case where the action state is switched and the execution condition of the second change instruction is also met, the processor 102 generates an instruction for changing the contents of the security protection process, so that the security becomes the highest.

In Step S122, the processor 102 may generate the instruction indicating the contents of the security protection process, or may also generate, as the instruction, the information for determining the contents of the security protection process.

<h2. Flowchart Executed by Support Apparatus>

A flowchart for a process executed by the support apparatus is described with reference to FIG.

Figure 19:
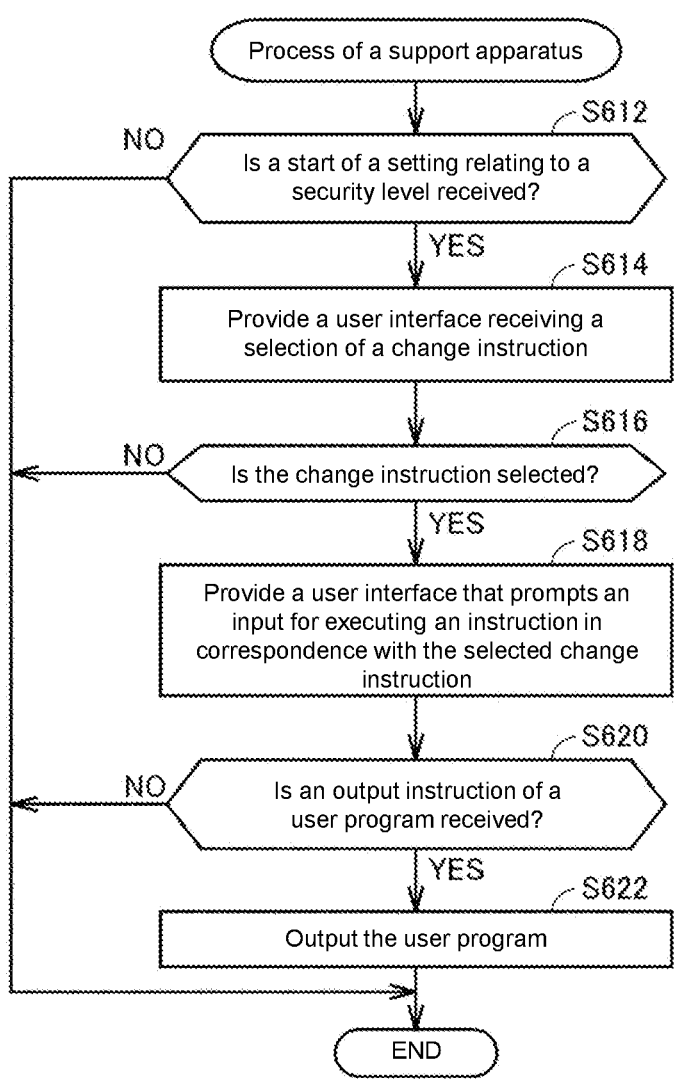
FIG. 19 is a flowchart illustrating an example of a process executed by the support apparatus 600.

19. FIG. 19 is a flowchart illustrating an example of the process executed by the support apparatus 600.

In Step S612, the processor 602 determines whether a start of the setting relating to the security level is received. In the case where the start of the setting relating to the security level is not received ("NO" in Step S612), the processor 602 ends the process.

In the case where the start of the setting relating to the security level is received ("YES" in Step S612), in Step S614, the processor 602 provides a user interface for receiving the selection of the change instruction.

In Step S116, the processor 602 determines whether the change instruction is selected. In the case where the change instruction is not selected ("NO" in Step S616), the processor 602 ends the process.

In the case where the change instruction is selected ("YES" in Step S616), in Step S618, the processor 602 provides the user interface that prompts for the input for execution of the instruction in correspondence with the change instruction that is selected.

In Step S620, the processor 602 determines whether an output instruction of the user program is received. In the case where the output instruction is not received ("NO" in Step S620), the processor 602 ends the process.

In the case where the output instruction is received ("YES" in Step S620), the processor 602 outputs the user program including the change instruction in Step S622.

<I. Modified Examples>
(Modified Example 1)

In the above embodiment, the contents of the security protection process are set in correspondence with multiple predetermined security levels. However, the contents of the security protection process may also be determined in accordance with one of the action state of the control unit 100 and the results of the control arithmetic operation. For example, the contents of the security protection process may also be defined for each of the action state and the results of the arithmetic operation without using an intermediate variable referred to as the security level. In addition, while the user interface provided by the support apparatus 600 uses the intermediate variable referred to as the security level, the contents of the security protection process can also be set for each action state and each second change instruction without using the intermediate variable.

(Modified Example 2)

In the above embodiment, the contents of the security protection process are determined in accordance with each of the action state and the results of the control arithmetic operation. However, the contents of the security protection process may also be determined in accordance with only the information of one of the action state and the results of the control arithmetic operation. In addition, as the user program 1086, an example in which the change instruction is provided is described. However, a program equivalent to the change instruction may also be provided in advance as a system program.

For example, the control unit 100 may also have a function that the contents of the security protection process can be changed in correspondence with the action state of the control unit 100 before the user forms and installs the user program 1086. In such case, the contents of the security protection process of each action state may be set in default, and may be configured as being changeable by the user.

(Modified Example 3)

The control unit 100 and the security unit 200 may also be configured integrally. In this case, the function of the control unit 100 may be realized by a CPU, and the function of the security unit 200 may be realized by another CPU. In addition, the control unit 100 and the security unit 200 may also be realized by using a multi-core CPU. For example, the function of the control unit 100 may be assigned to a core of the multi-core CPU, and the function of the security unit 200 may also be assigned to another core of the multi-core CPU.

3. Appendix

According to the above, the above embodiment and modified examples include the following disclosure.

<Configuration 1>

A controller system (1, 1*a*), including: a control apparatus (100, 100*a*), executing a control program for realizing a control arithmetic operation for controlling a control target; and a security monitoring device (200, 200*a*), executing a security protection process (2083) including detection of a security event possible to occur in the controller system and execution of a process in correspondence with the security event, wherein execution contents of the security protection process performed by the security monitoring device are determined in accordance with at least one of an action state of the control apparatus and a notification issued by the control arithmetic operation by the control apparatus.

<Configuration 2>

The controller system according to Configuration 1, wherein the control program includes a user program (1086, 1086*a*) arbitrarily formed by a user and a system program (1084) for providing a function as the control apparatus, the action state is controlled through execution of the system program (1022), and the notification issued by the control arithmetic operation by the control apparatus is a notification issued through execution of the user program.

<Configuration 3>

The controller system according to Configuration 1 or 2, wherein the action state includes an execution state in which the control program is executed, and in a case in which the control apparatus is in the execution state, the security monitoring device executes the security protection process to enable communication between the control apparatus and a superordinate apparatus of the control apparatus.

<Configuration 4>

The controller system according to Configuration 1 or 2, wherein the action state includes a permitted state in which a change of the control program is permitted, and in a case in which the control apparatus is in the permitted state, the security monitoring device executes the security protection process to disable communication between the control apparatus and a superordinate apparatus of the control apparatus.

<Configuration 5>

The controller system according to Configuration 1 or 2, wherein the notification issued by the control arithmetic operation includes a notification of an abnormality generated in the control target, and in a case with the notification of the abnormality, the security monitoring device enables communication between the control apparatus and a superordinate apparatus of the control apparatus.

<Configuration 6>

A control apparatus (100, 100*a*), executing a control program for realizing a control arithmetic operation for controlling a control target, the control apparatus including: a communication interface (110) for connecting with a security monitoring device (200, 200*a*) executing a security protection process (2083) including detection of a security event possible to occur in the control apparatus and execution of a process in correspondence with the detected security event; and a program execution part (102) executing the control program, wherein the program execution part notifies the security monitoring device with an instruction for executing the security protection process determined in accordance with at least one of an action state of the control apparatus and a notification issued by the control arithmetic operation by the control apparatus.

<Configuration 7>

A control program (1084, 1086, 1086*a*), executed by a control apparatus for executing a control arithmetic operation for controlling a control target, wherein the control apparatus is connected with a security monitoring device (200, 200*a*) executing a security protection process (2083) including detection of a security event possible to occur in the control apparatus and execution of a process in correspondence with the detected security event, and the control program cause a computer to execute: a step (S120) of generating an instruction for executing the security protection process determined in accordance with at least one of an action state of the control apparatus and a notification issued by the control arithmetic operation by the control apparatus; and a step (S140) of notifying the security monitoring device with the instruction generated in the generation step.

It should be considered that the embodiments disclosed herein are exemplary in all respects and not restrictive. The scope of the invention is defined by the scope of claims, not the above description, and is intended to include all the modifications within the meaning and scope of the claims. Further, the invention described in the embodiments and the respective modifications are intended to be carried out alone or in combination, where possible.

What is claimed is:

1. A controller system, comprising:

a first communication controller, a network controller, a control apparatus, comprising a first processor configured to:

execute a control program to perform a control arithmetic operation for controlling a control target through the network controller;

manage an action state comprising an operation mode of the control apparatus in which the control program is executed;

in a case of determining that the action state is switched, specify a security level and contents of a security protection process corresponding to the switched action state, wherein the security level defines the contents of the security protection process including at least: first information whose output from the control apparatus is limited, a limitation on an output destination permitted to receive the first information, second information whose input to the control apparatus is limited, and a limitation on an apparatus permitted to transmit the second information to the control apparatus;

in a case of determining that a notification issued through the control arithmetic operation, perform a security level change and specify the contents of the security protection process in correspondence with the notification issued through the control arithmetic operation, where the notification indicating an abnormality generated in the control target; and generate an instruction for changing the contents of the security protection process upon occurrence of at least one of: the action state being switched, or the notification being issued through the control arithmetic operation, and notify a security monitoring device with the generated instruction; wherein, in a case where both the action state is switched and the notification is issued through the control arithmetic operation, the generated instruction changes the contents of the security protection process such that the security protection process is enhanced; and a security monitoring device, comprising:

a second communication controller, configured to communicably connected with the control apparatus, and a second processor configured to:

detect a security event by receiving the notification issued by the control arithmetic operation; and execute the security protection process in correspondence with the security event, wherein:

execution the contents of the security protection process performed by the second processor of the security monitoring device are determined in accordance with the instruction generated by the control apparatus, wherein the instruction indicates the contents of the security protection process corresponding to at least one of the switched action state or the notification issued by the control arithmetic operation by the first processor of the control apparatus, during the operation mode, the control program is configured to control the control target, and the security protection process is configured to maintain communication between the control apparatus and a superordinate apparatus and disable communication with an external network as long as the action state of the control apparatus operates in the operation mode and in a case of having detected the security event, the first processor is configured to issue the notification and the second processor is further configured to:

change the security protection process to disable communication from the superordinate apparatus toward the control apparatus, enable communication from the control apparatus toward the superordinate apparatus, and to enable communication with the external network in response to detecting the notification which indicates the abnormality.

2. The controller system as claimed in claim 1, wherein the control program comprises a user program defined by a user and a system program for providing a function as the control apparatus, the action state is controlled through an execution of the system program, and the notification issued by the control arithmetic operation by the control apparatus is issued through the execution of the user program.

3. The controller system as claimed in claim 1, wherein in a case in which the control apparatus returns to the operation mode from the abnormality, the second processor of the security monitoring device executes the security protection process to enable communication between the control apparatus and a superordinate apparatus of the control apparatus.

4. The controller system as claimed in claim 1, wherein the action state comprises a program mode in which a rewriting of the control program is permitted, and in a case in which the control apparatus is in the program mode, the second processor of the security monitoring device executes the security protection process to disable communication between the control apparatus and the superordinate apparatus of the control apparatus.

5. The controller system as claimed in claim 4, wherein in a case in which the control apparatus is changed from the program mode to the operation mode, the second processor of the security monitoring device enables communication between the control apparatus and a superordinate apparatus of the control apparatus.

6. A control apparatus, comprising a first communication controller, a network controller, and a first processor configured to:

execute a control program for realizing a control arithmetic operation for controlling a control target through the network controller, manage an action state comprising an operation mode of the control apparatus in which the control program is executed;

in a case of determining that the action state is switched, specify a security level and contents of a security protection process corresponding to the switched action state, wherein the security level defines the contents of the security protection process including at least: first information whose output from the control apparatus is limited, a limitation on an output destination permitted to receive the first information, second information whose input to the control apparatus is limited, and a limitation on an apparatus permitted to transmit the second information to the control apparatus;

in a case of determining that a notification issued through the control arithmetic operation, perform a security level change and specify the contents of the security protection process in correspondence with the notification issued through the control arithmetic operation, where the notification indicating an abnormality generated in the control target; and generate an instruction for changing the contents of the security protection process upon occurrence of at least one of: the action state being switched, or the notification being issued through the control arithmetic operation; wherein, in a case where both the action state is switched and the notification is issued through the control arithmetic operation, the generated instruction changes the contents of the security protection process such that the security protection process is enhanced, wherein the first communication controller is configured to connect with a second communication controller of a security monitoring device which further comprises a second processor configured to;

detect a security event by receiving the notification issued by the control arithmetic operation, and execute the security protection process in correspondence with the detected security event, wherein the first processor is further configured to notify the security monitoring device with the instruction generated by the control apparatus for causing the second processor of the security monitoring device to execute the contents of the security protection process determined in accordance with the instruction, wherein the instruction indicates the contents of the security protection process corresponding to at least one of the switched action state or the notification issued by the control arithmetic operation by the first processor of the control apparatus, wherein during the operation mode, the control program is configured to control the control target, the security protection process is configured to maintain communication between the control apparatus and a superordinate apparatus and disable communication with an external network as long as the action state of the control apparatus operates in the operation mode, in a case of having detected the security event, the first processor is further configured to issue the notification and the control program is configured to control the security protection process to:

change the security protection process to disable communication from the superordinate apparatus toward the control apparatus, enable communication from the control apparatus toward the superordinate apparatus, and to enable communication with the external network in response to detecting the notification which indicates the abnormality.

7. A non-transitory computer readable medium, storing a control program executed by a first processor of a control apparatus which further comprises a first communication controller and a network controller for executing a control arithmetic operation for controlling a control target through the network controller, wherein the first processor is configured to:

manage an action state comprising an operation mode of the control apparatus in which the control program is executed; and in a case of determining that the action state is switched, specify a security level and contents of a security protection process corresponding to the switched action state, wherein the security level defines the contents of the security protection process including at least: first information whose output from the control apparatus is limited, a limitation on an output destination permitted to receive the first information, second information whose input to the control apparatus is limited, and a limitation on an apparatus permitted to transmit the second information to the control apparatus;

in a case of determining that a notification issued through the control arithmetic operation, perform a security level change and specify the contents of the security protection process in correspondence with the notification issued through the control arithmetic operation, where the notification indicating an abnormality generated in the control target; and generate an instruction for changing the contents of the security protection process upon occurrence of at least one of: the action state being switched, or the notification being issued through the control arithmetic operation; wherein, in a case where both the action state is switched and the notification is issued through the control arithmetic operation, the generated instruction changes the contents of the security protection process such that the security protection process is enhanced, wherein the first processor of the control apparatus is configured to connect with a second communication controller of a security monitoring device which further comprises a second processor configured to:

detect a security event by receiving the notification issued by the control arithmetic operation, and execute the security protection process in correspondence with the detected security event, wherein:

the control program executed by the first processor of the control apparatus causes the control apparatus to: notify, through the first communication controller, the security monitoring device with the instruction generated by the control apparatus for causing the second processor of the security monitoring device to execute the contents of the security protection process determined in accordance with the instruction, wherein the instruction indicates the contents of the security protection process corresponding to at least one of the switched action state a or the notification issued by the control arithmetic operation by the first processor of the control apparatus, wherein during the operation mode, the control program is configured to control the control target, and the security protection process is configured to maintain communication between the control apparatus and a superordinate apparatus and disable communication with an external network as long as the action state of the control apparatus operates in the operation mode;

detect the security event and issue the notification after detecting the security event; and change the security protection process to disable communication from the superordinate apparatus toward the control apparatus, enable communication from the control apparatus toward the superordinate apparatus, and to enable communication with the external network in response to detecting the notification indicating the abnormality.

8. The controller system of claim 1, wherein the processor is further configured to switch to from the operation mode or the abnormality to a program mode.

9. The controller system of claim 8, wherein in response to operating in the program mode, the processor is further configured to disable any communication with the superordinate apparatus, disable any communication with the external network, and disable any virtual private network (VPN).

10. The controller system of claim 9, wherein the processor is further configured to switch to from the operation mode or the abnormality to an online editing mode.

11. The controller system of claim 10, wherein in response to operating in the online editing mode, the processor is further configured to maintain the communication with the superordinate apparatus, maintain the communication with the external network, and maintain the VPN.

12. The controller system of claim 11, wherein the processor is further configured to switch to from the operation mode or the abnormality to a maintenance mode.

13. The controller system of claim 12, wherein in response to operating in the maintenance, the processor is further configured to disable the communication with the superordinate apparatus, maintain the communication with the external network, and maintain the VPN.

14. The controller system of claim 13, wherein each of the operation mode, abnormality, maintenance mode, the online editing mode, and the program mode is associated with a different security level.

15. The controller system of claim 14, wherein each of the different security levels is associated with a different VPN user level.

\* \* \* \* \*